United States Patent
Bagley et al.

(10) Patent No.: US 11,255,426 B2
(45) Date of Patent: Feb. 22, 2022

(54) ROTARY SHIFTER WITH AUTO-RETURN AND CAM LOCK MECHANISM

(71) Applicant: GHSP, Inc., Grand Haven, MI (US)

(72) Inventors: John Thomas Bagley, Grand Haven, MI (US); Phillip Torrey Merrill, II, Ravenna, MI (US)

(73) Assignee: GHSP, Inc., Holland, MI (US)

( * ) Notice: Subject to any disclaimer, the term of this patent is extended or adjusted under 35 U.S.C. 154(b) by 210 days.

(21) Appl. No.: 16/609,362

(22) PCT Filed: May 23, 2018

(86) PCT No.: PCT/US2018/034090
§ 371 (c)(1),
(2) Date: Oct. 29, 2019

(87) PCT Pub. No.: WO2018/217865
PCT Pub. Date: Nov. 29, 2018

(65) Prior Publication Data
US 2020/0191259 A1 Jun. 18, 2020

Related U.S. Application Data

(60) Provisional application No. 62/510,451, filed on May 24, 2017.

(51) Int. Cl.
*F16H 59/08* (2006.01)
*F16H 61/22* (2006.01)
*F16H 61/24* (2006.01)
*F16H 63/48* (2006.01)
*G05G 1/10* (2006.01)
*G05G 5/05* (2006.01)
*G05G 5/06* (2006.01)

(52) U.S. Cl.
CPC ............. *F16H 59/08* (2013.01); *F16H 61/22* (2013.01); *F16H 61/24* (2013.01); *F16H 63/48* (2013.01);
(Continued)

(58) Field of Classification Search
CPC .... F16H 59/08; F16H 2059/081; F16H 61/22; F16H 61/24; F16H 2061/223;
(Continued)

(56) References Cited

U.S. PATENT DOCUMENTS

2006/0037424 A1 * 2/2006 Pickering ................ F16H 59/08
74/473.3
2009/0000407 A1 1/2009 Meyer et al.
(Continued)

FOREIGN PATENT DOCUMENTS

DE 102012112649 A1 * 4/2014 ............. F16H 59/50
EP 2660091 11/2013
(Continued)

*Primary Examiner* — Joseph Brown
(74) *Attorney, Agent, or Firm* — Price Heneveld LLP

(57) ABSTRACT

The present rotary shifter includes a rotary locking mechanism, a feel positioner mechanism, and a return-to-home-position (park) mechanism that causes the shifter/rotor to remain locked in park while the locking mechanism resets after the shifter is returned to park. The design allows any number of locking positions based on a height of the drum cam and a position of the follower. As illustrated, a dial-type rotor is moved into home position by pusher features on the drum cam and an actuator motor, while the feel positioner is disengaged, thus allowing for a smoother rotary movement. Once in the home (park) position, a lock ring (also called "follower") is forced upwards by a spring (or other method) and rides on a track at a different height than the original, therefore keeping it engaged in the rotor until the drum cam rotates back to its locking position.

19 Claims, 21 Drawing Sheets

(52) U.S. Cl.
CPC ............... *G05G 1/10* (2013.01); *G05G 5/05* (2013.01); *G05G 5/06* (2013.01); *F16H 2059/081* (2013.01); *F16H 2061/223* (2013.01); *F16H 2061/247* (2013.01); *G05G 2505/00* (2013.01)

(58) Field of Classification Search
CPC ...... F16H 2061/247; G05G 1/10; G05G 5/05; G05G 5/06; G05G 2505/00
USPC .......................................................... 74/473.3
See application file for complete search history.

(56) References Cited

U.S. PATENT DOCUMENTS

| | | | |
|---|---|---|---|
| 2014/0338488 A1 | 11/2014 | Hermansson | |
| 2014/0345409 A1* | 11/2014 | Watanabe | F16H 59/08 74/473.3 |
| 2015/0152958 A1 | 6/2015 | Watanabe et al. | |
| 2015/0167827 A1* | 6/2015 | Fett | F16H 59/0278 74/473.3 |
| 2015/0369358 A1* | 12/2015 | Lee | G05G 5/05 74/507 |
| 2016/0238128 A1* | 8/2016 | Rake | F16H 59/08 |
| 2016/0245403 A1* | 8/2016 | Rake | F16H 59/08 |

FOREIGN PATENT DOCUMENTS

| | | | |
|---|---|---|---|
| RU | 2551786 | 11/2013 | |
| SU | 258797 | 12/1969 | |
| WO | WO-2015107592 A1 * | 7/2015 | ............. F16H 59/02 |
| WO | WO-2017003481 A1 * | 1/2017 | ................ B60T 7/10 |
| WO | 2017049051 | 3/2017 | |

\* cited by examiner

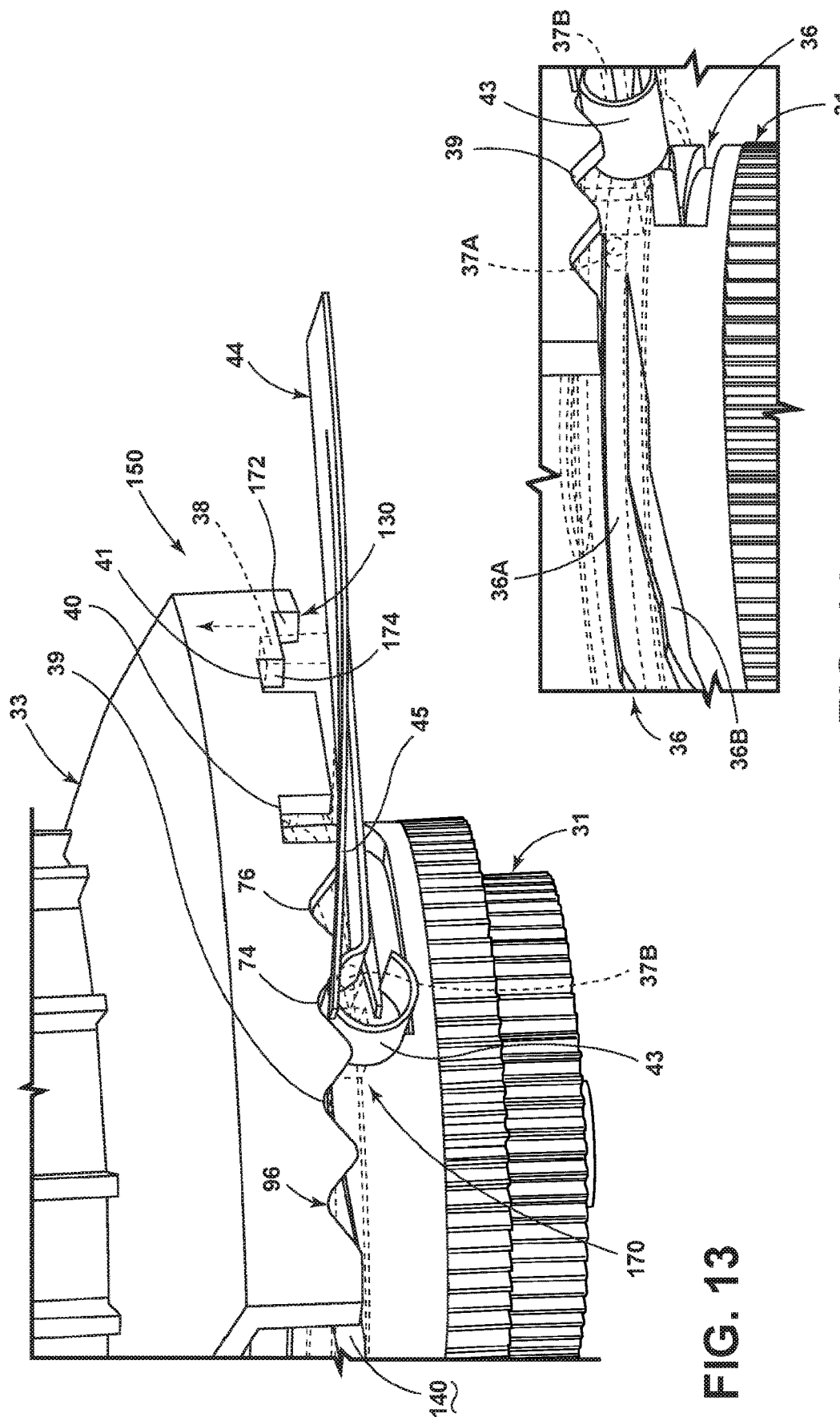

ROTARY SHIFTER WITH AUTO-RETURN AND CAM LOCK MECHANISM

FIELD OF THE DEVICE

The present invention relates to rotary shifters, and more particularly to rotary shifters for vehicle transmissions, though not limited to only vehicle transmissions.

BACKGROUND

Many vehicle manufacturers now incorporate shift-by-wire transmission shifters into vehicles. In these shifters, control of the vehicle's power train and transmission is accomplished in significant part by using electrical signals generated from the transmission shifter as the vehicle's driver selects different gear shift positions such as park, reverse, neutral, and drive. Safety and design flexibility of the shifters are important as various features are incorporated into the shifters. In particular, an improvement is desired to maintain a high level of safety in an auto return-to-park operation of a shifter.

An improvement is desired that provides savings/improvements in terms of cost, capital investment, efficiency of installation and removal, safety, design flexibility, and improvement in control over shifter components during an auto return-to-park function.

SUMMARY OF THE PRESENT INVENTION

In one aspect of the present invention, a shifter apparatus for a vehicle comprises a base; a drum cam rotatably supported on the base and having a track. A lock ring is movably supported on the drum cam for rotation and axial movement, the lock ring having a follower pin engaging the track and a spring-bias pin and a notch-engaging lock pin. A rotor is movably supported on the drum cam and includes an undulating surface defining park (P), reverse (R), neutral (N) and drive (D) positions and at least one lever-controlling lock notch. A feel positioner mechanism includes at least one feel positioner spring with a spring loop operably engaging the undulating surface to hold the rotor in one of the P, R, N and D positions. A rotor control mechanism includes the lock pin, the lock notch, the track and the follower pin, with the track and follower pin interacting to control engagement and disengagement of the lock pin in the at least one lock notch. The spring-bias pin operably engages the spring loop based on axial movement of the lock ring and is configured to lock the spring loop against the undulating surface in at least one first spring position, and is configured to disengage the spring loop from the undulating surface in at least one second spring position. The track includes upper and lower track sections that control axial movement of the lock ring to thus control locking and unlocking of the feel positioner mechanism and to control locking and unlocking of the rotor control mechanism.

In another aspect of the present invention, a shifter apparatus for a vehicle comprises a base, a drum cam rotatably supported on the base and having a track. A lock ring is movably supported on the drum cam for rotation and axial movement, the lock ring having a follower pin engaging the track, a spring-bias pin and a notch-engaging lock pin. A rotor is movably supported on the drum cam and includes an undulating surface defining P, R, N and D positions. A feel positioner mechanism includes at least one feel positioner spring with a spring operably engaging the undulating surface to hold the rotor in one of the P, R, N and D positions. The spring-bias pin operably engages the spring based on axial movement of the lock ring and is configured to control engagement and disengagement of the spring against the undulating surface.

In another aspect of the present invention, a shifter apparatus for a vehicle comprises a base and a drum cam rotatably supported on the base and having a track. A lock ring is movably supported on the drum cam for rotation and axial movement, the lock ring having a follower pin engaging the track and a notch-engaging lock pin. A rotor is movably supported on the drum cam and includes at least one lever-controlling lock notch. A rotor control mechanism includes the lock pin, the lock notch, the track and the follower pin, with the track and follower pin interacting to control engagement and disengagement of the lock pin in the at least one lock notch.

In another aspect of the present invention, a shifter apparatus for a vehicle comprises a base and a drum cam rotatably supported on the base and having a track. A lock ring is movably supported on the drum cam for rotation and axial movement, the lock ring having a follower pin engaging the track, a spring-bias pin and a notch-engaging lock pin. A dial-simulating rotor is movably supported on the drum cam. A feel positioner mechanism and a rotor control mechanism have mating components on the rotor, the lock ring, and the drum cam. The lock ring moves axially to lock and unlock the rotor control mechanism to control rotation of the rotor, and the lock ring moves axially to selectively engage and disengage the feel positioner.

In another aspect of the present invention, a shifter apparatus for a vehicle comprises a base and a drum cam rotatably supported on the base and having a track. A lock ring is movably supported on the drum cam for rotation and axial movement, the lock ring having a follower pin engaging the track and a spring-bias pin and a notch-engaging lock pin. A rotor is movably supported on the drum cam and includes an undulating surface defining P, R, N and D positions and at least one lever-controlling lock notch. A feel positioner mechanism is constructed to hold the rotor in one of the P, R, N and D positions. A rotor control mechanism includes the lock pin, the lock notch, the track and the follower pin, with the track and follower pin interacting to control engagement and disengagement of the lock pin in the at least one lock notch. Sensors on the rotor control mechanism sense a position of the rotor and the lock ring. An actuator is operably connected to at least one of the rotor, the drum cam and the lock ring for disengaging the lock pin from the lock notch and for moving the rotor to a home position. A control circuit is connected to the sensors and actuator, the control circuit being programmed to cause the actuator to perform a return-to-home operation that includes disengaging the lock pin from the lock notch and then rotating the rotor to the home position.

In another aspect of the present invention, a method includes providing a vehicle shifter including a dial-simulating rotor, a drum cam, a lock ring, a feel positioner mechanism, a rotor-control mechanism, and at least one actuator for controlling the feel positioner mechanism and the rotor-control mechanism; and providing a vehicle electrical control system operably connected to the at least one actuator and to sensors on the shifter. The method further includes sensing that the rotor is in a locked first position; operating the at least one actuator to release the feel positioner mechanism so that the rotor can move without inconsistent friction and operating the at least one actuator to cause the rotor control mechanism to unlock the rotor from the locked first position; operating the at least one actuator to move the rotor to a new position; and operating the at least one actuator to re-engage the feel positioner mechanism and to re-engage the rotor control mechanism.

In another aspect of the present invention, a shifter apparatus comprises a shifter including a lever defining P, R, N, and D positions, and including a feel positioner mechanism, a lever-control mechanism, and at least one actuator for controlling the feel positioner mechanism and the lever-control mechanism. The feel positioner mechanism includes an undulating surface with depressions associated with the P, R, N and D positions, and including a spring with a depression-engaging spring loop. The lever-control mechanism includes a bias pin extending through the spring loop and the lever-control mechanism also includes an actuator that moves the bias pin between a first position where the bias pin engages the spring loop and holds the spring loop against the undulating surface, a second position where the bias pin is generally in a center of the spring loop and thus allows the spring loop to float up or down without restriction from the bias pin, and a third position where the bias pin engages the spring loop and holds the spring loop away from the undulating surface such that the feel positioner is totally disengaged.

In another aspect of the present invention, a shifter apparatus comprises a rotating drum cam with a continuous track; a lock ring including a follower which moves in an axial direction; and a rotor with a lock feature for the cam follower to engage to lock the rotation of the rotor. The follower sequentially engages an upper portion and a lower portion of the track to switch between two different cam paths and consequently switch between two different functions of the follower position based on a relative angle of the drum cam to the lock ring. A geometry of the track and a biasing member on the lock ring determine the path taken depending on the direction of the drum cam rotation.

In another aspect of the present invention, a combination of the rotor, the drum cam and the lock ring interact to define at least three operative positions including a first position that allows free rotation of the rotor, a second position that locks an angular position of the rotor, and a third position where movement of the rotor is allowed but controlled based on the drum cam's relative angular position to the rotor, resulting in a benefit where the two distinct drum cam paths have an ability to keep the rotor locked throughout the entire rotation of the cam while the drum cam is in one of the different cam paths. By this arrangement, the rotor can move easily from one rotational position to another, but the cam locks the rotor in the home position while the drum cam returns to an original home position.

In another aspect of the present invention, a shifter apparatus comprises a base and a shifter rotatingly supported on the base, a rotating drum cam with a track, and a cam ring including a follower which moves the cam ring in an axial direction as the follower engages and moves along the track. The shifter includes a rotor with a lock feature for the cam follower to engage to lock the rotation of the rotor, an actuation arm on the cam ring, a first spring having a spring loop which surrounds an actuation arm, and an additional spring which applies a small bias to the actuation arm. A combination of the actuation arm's outer diameter, the spring loop's inner diameter, and the follower's motion cause the follower to move between a free state where the rotor moves without resistance and a force-generating state where the actuation arm generates reaction forces against the surfaces of the drum cam to affect rotation of the rotor, and where the reaction forces against the cam ring are used to force the cam ring and follower to a particular position.

One aspect of the present invention is that the shifter rotates back to a home position and remains locked in the home position while the device reverses rotation. This allows a shifter to be returned to the park position and be immediately locked. It will remain locked while the device resets. A drum (barrel) cam includes dual paths and a locking follower/rotor arrangement. The axial path the follower takes is dependent on the direction which the drum cam rotates. The follower would be biased towards a neutral position to be placed in position for the appropriate path.

In another aspect of the present invention, a shifting apparatus for a vehicle includes a base. A drum cam is rotatably supported on the base and has a track. A lock ring is rotationally supported on the base and is axially operable relative to the track of the drum cam. A rotor is rotationally supported on the base. The lock ring extends between the drum cam and the rotor. Rotational operation of the track of the drum cam defines a plurality of axial positions of the lock ring. The plurality of axial positions correspond to a plurality of gear positions of the rotor.

These and other aspects, objects, and features of the present invention will be understood and appreciated by those skilled in the art upon studying the following specification, claims, and appended drawings.

BRIEF DESCRIPTION OF DRAWINGS

In the drawings:

FIG. 13 is a cutaway perspective view of the drum cam of FIG. 12 showing the lock pin on the lock ring in the fully-locked position in a lock gate notch and the knob in a neutral position;

FIG. 14 is an enlarged perspective view of the drum cam of FIG. 13;

DETAILED DESCRIPTION OF PREFERRED EMBODIMENTS

Figure 1:
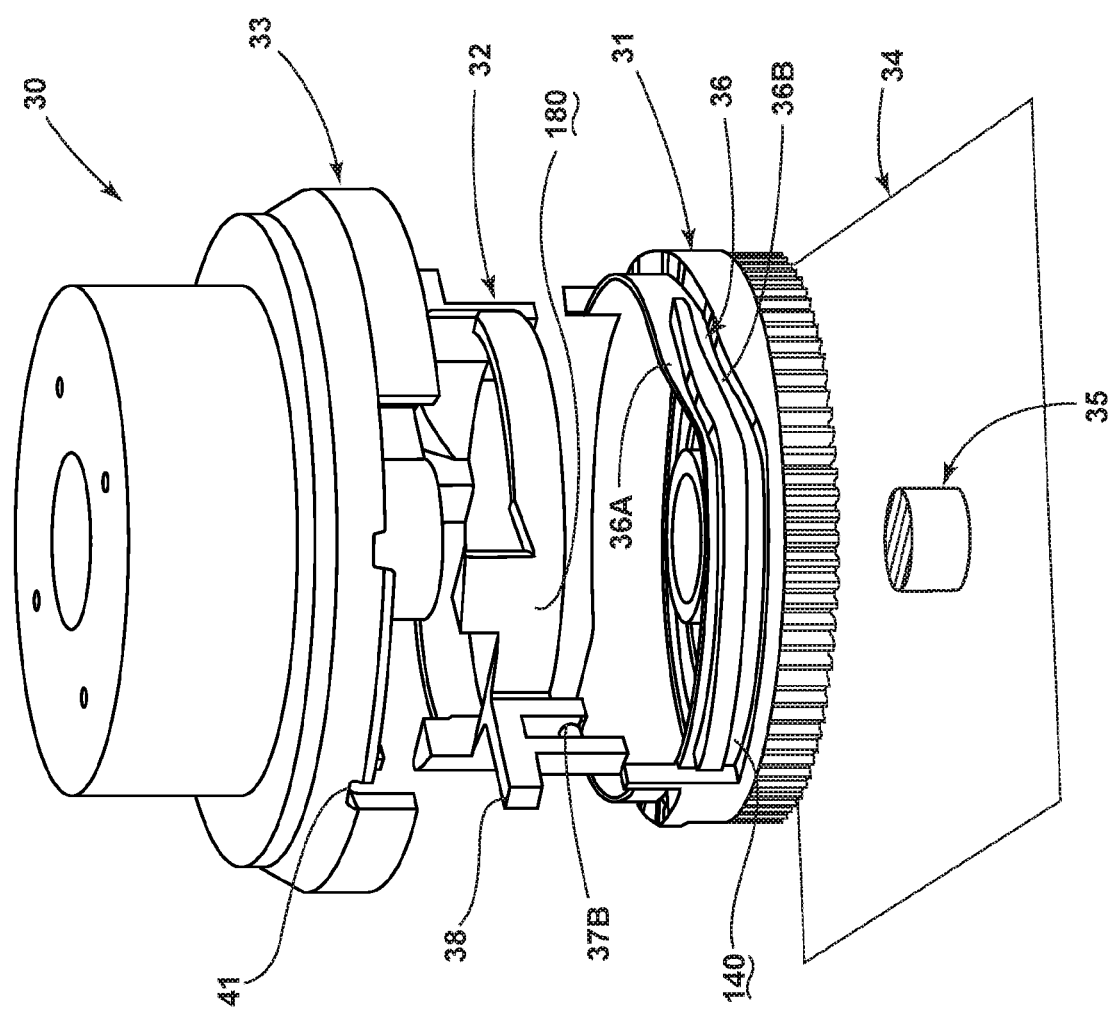
FIG. 1 is an exploded perspective view of a rotary shifter having a locking function and an auto return-to-park (RTP) function.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-14, the present shifter apparatus 30 includes a drum cam 31, a lock ring 32 that typically includes a follower, and a rotor 33, shown as a knob or dial, that is operably mounted on a base 34 and shaft 35. These components and others described below interact to cause a locking function when the shifter apparatus 30 is in any one of various gear positions 70 that can include park, neutral and drive positions 72, 74, 76. These components also interact when the vehicle is shut off to cause a return-to-park or RTP function 78 where the rotor 33 is locked in park 72 until the auto RTP function 78 is complete, as also described below. The present shifter apparatus 30 locks in a unique way when in certain positions such as park 72 or neutral 74 and partially locks the shifter apparatus 30 when in other certain gear positions 70 such as drive 76. The present shifter apparatus 30 also includes an auto RTP function 78 to automatically move the shifter apparatus 30 to a return-to-park (RTP) position 80 after the vehicle has been turned off. The actual park-locking function of the transmission can typically occur upon turning off the vehicle. The present shifter apparatus 30 will automatically return the rotor 33 or the shift lever to park 72 as a matter of driver convenience when the vehicle is turned off. Advantageously, the present inventive concepts allow significant design flexibility in terms of which gear positions 70 are locked, or partially locked, or released and also in terms of when the gear positions 70 are locked, partially locked, or released. The present inventive concepts also allow significant flexibility in terms of the RTP function 78 (e.g., gear position), and in terms of electronic control and sensing of shifter conditions.

If a driver moves the shifter apparatus 30 from park 72 to reverse 90, the present shifter apparatus 30 functions to permit shifting out of park 72. When the driver places their foot on the brake (or uses a release button), the present shifter apparatus 30 unlocks by rotating the drum cam 31 to an artificial feel (AF) position 92 where an AF spring 94 is engaged within AF detents 96. In the AF position 92, the driver will typically experience normal shifter feel in all cases. Accordingly, the AF spring 94 will center the rotor 33 and selectively hold the rotor 33 in a particular gear position 70. The locking of the present shifter apparatus 30 typically happens in park 72, neutral 74 and drive 76. The RTP function 78 may also be initiated from any gear position 70, and the position sensors will monitor the position of the drum cam 31 and rotor 33 in all cases. The present shifter apparatus 30 includes two magnets and associated position sensors; one set of position sensors being for monitoring a position of the rotor 33 and one set of position sensors monitoring a position of the drum cam 31. The pairs of magnets and sensors act semi-independently and are operably connected to the vehicle's electrical (control) system. The configuration of the pairs of magnets and sensors (shown in FIGS. 20 and 21) will be described more fully below.

The present shifter apparatus 30 includes the rotor 33 that auto-returns to park 72, typically after the vehicle has been turned off. The actual park-locking function of the transmission happens, typically, immediately after the vehicle is turned off. However, the rotor 33 will return to home position, such as park 72, as a matter of convenience to the driver. The drum cam 31 will rotate to the RTP position 80 which removes the detent-type forces of the AF spring 94 and causes the rotor 33 to then rotate to park 72 when a slot 110 in the underside of the drum cam 31 comes into contact with the feature on the knob that holds a sensor magnet 112 (shown in FIGS. 20-23). The rotor 33 typically takes the form of rotating knob or dial.

Automatically placing the vehicle transmission in park is a recent requirement by automotive original equipment manufacturer (OEM) companies, as is the removal of the detent-type forces between the rotor 33 and the AF spring 94 so that there is no perceived "start-stop" motion when viewing the rotor 33, nor motor wavering sound when hearing the RTP function 78 operate as the rotor 33 is returned to park 72.

In the present device, during the RTP function 78, the present shifter apparatus 30 disengages the feel positioner 120 by retracting the AF spring 94 of the feel positioner 120, thus separating a detent-engaging feature of the AF spring 94 away from the associated undulating surface 39 of the feel positioner 120. The undulating surface 39 typically includes the AF detents 96 of the rotor 33 that define, at least, the park, reverse, neutral and drive positions 72, 90, 74, 76. This configuration allows the RTP function 78 to operate easily and consistently. This is a separate mode of the feel positioner 120 than that shown in, for example, FIG. 13, where the rotor 33 is locked and the feel positioner 120 is fully engaged with and locked against the undulations 39 having the AF detents that form at least the park, reverse, neutral and drive positions 72, 90, 74, 76. This is also a different mode of the feel positioner 120 than that shown in, for example, FIG. 15, where the rotor 33 is unlocked but the AF spring 94 still biases the feel positioner 120 into the surface undulations 39. This is also different from the mode exemplified in FIG. 16 where the AF spring 94 is retracted from the AF detents 96 and the feel positioner 120 is disengaged so that the rotor 33 can be moved back to park 72 without any detent-type or "start-stop" forces from the feel positioner 120 affecting the rotation of the rotor 33.

In regard to the figures, FIG. 1 is an exploded perspective view of the drum cam 31 with track 36 that includes upper and lower track sections 36A, 36B. The follower or lock ring 32 includes cam follower/bias pin 37 that engages the track 36 and includes at least one lock pin 38. The rotor 33 includes surface undulations 39 having depressions associated with at least the P, R, N, and D positions (72, 90, 74, 76). The surface undulations 39 of the rotor 33 also includes a lock notch 40 for park 72 and a gate lock notch 41 for neutral 74 (and a shallow half notch 130 for drive 76 connected to the gate lock notch 41). The notches 40, 41 are selectively engaged by the corresponding lock pin 38 as will be described below.

The rotor 33 is shown as a rotatable dial-type knob. However, it is noted that the present invention can be implemented in other shifting mechanisms, such as levers, and can be broader than just the illustrated rotary/dial shifter system.

According to the various aspects of the device, the components of the present shifter apparatus 30 interact to cause/facilitate a locking function when in selected gear positions 70 and to control operation of the shifter apparatus 30 including movement of the rotor 33 for safety and vehicle control and driver-convenience reasons. The components of the shifter apparatus 30 also interacts to cause/facilitate an auto return-to-park RTP function 78 when the vehicle is shut off for safety and convenience reasons.

Figure 1A:
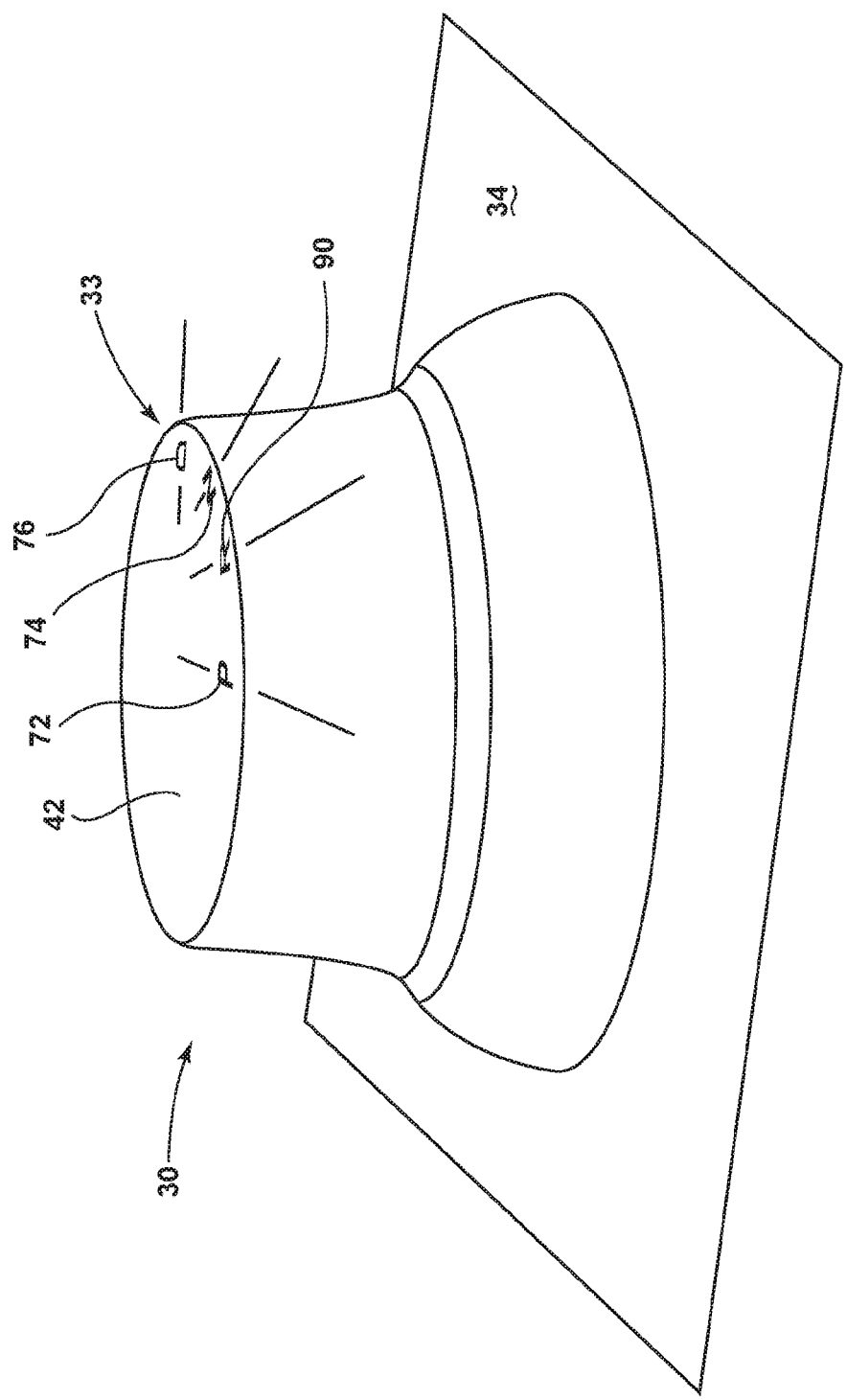
FIG. 1A is a perspective view of a rotary shifter.

FIG. 1A is a perspective view of the shifter apparatus 30 of FIG. 1 operably mounted with an axle or shaft 35 (shown in FIGS. 1, 2 and 3) and an aesthetic cover/housing 42 (see also FIGS. 7 and 21) on a base 34, such as a vehicle console, steering column or instrument panel.

Figure 3:
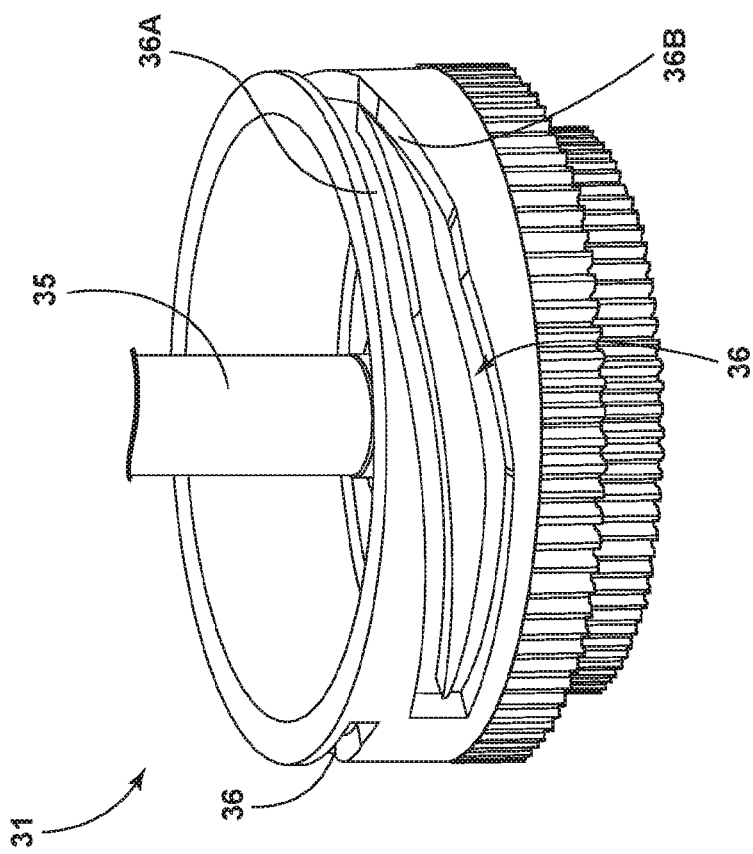
FIG. 3 is another side perspective view of a circumferential portion of a drum cam having a circumferential track defined on the outer surface of the drum cam and including upper and lower track sections.
Figure 2:
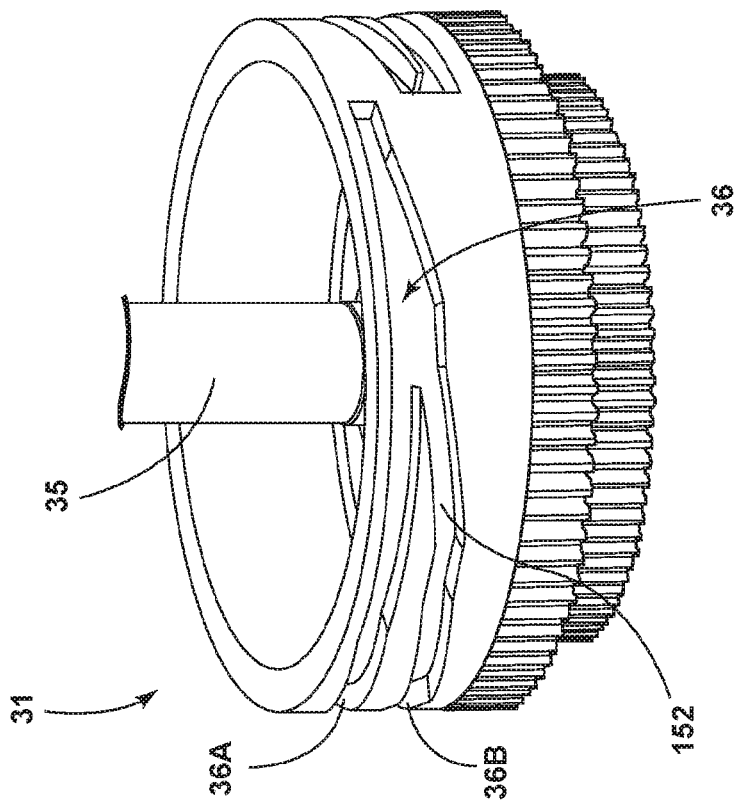
FIG. 2 is a side perspective view of a circumferential portion of a drum cam having a circumferential track defined on the outer surface of the drum cam and including upper and lower track sections.

FIGS. 2-3 are perspective views of different circumferential portions of the drum cam 31 of FIG. 1. FIGS. 2-3 combine to show a substantially complete shape of the circumferential track 36 defined on the outer surface 140 of the drum cam 31, including upper track section 36A and lower track section 36B that combine to form the track 36 as a continuous loop. The upper track section 36A defines a path where an inner leg 37A of the follower/bias pin 37 (see FIGS. 4 and 7-19) causes the lock ring 32 (and lock pins 38 and outer leg 37B of the bias pin 37) to selectively move (generally axially as illustrated) along a predetermined path. Rotation of the drum cam 31 slidably operates the inner leg 37A within the track 36 and causes an axial movement of the lock ring 32 with respect to the relative rotational portion of the drum cam 31. This axial movement causes the lock pins 38 to move and disengage one of the notches 40, 41 associated with park, neutral and/or drive positions 72, 74, 76, thus locking a particular rotational position of the rotor 33.

The lower track section 36B defines a path where the inner leg 37A of the follower/bias pin 37 translates through the track 36 during rotation of the drum cam 31 and causes the lock ring 32 (and lock pins 38 and outer leg 37B of the bias pin 37) to selectively move (generally axially as illustrated) along a predetermined path. For example, this interaction of the track 36 and the inner leg 37A causes the lock pins 38 to move axially downward and disengage from the specific notches 40, 41 associated with park, neutral and/or drive positions 72, 74, 76, thus unlocking the rotor 33 for rotational movement. In this manner, rotation of the drum cam 31 locks the rotor 33 as well as momentarily engaging it to rotate it in, typically, one direction such as during performance of the RTP function 78. Once locked, the lock pin 38 and notch 40 or 41 remain engaged while the drum cam 31 resets to another operating position. It should be understood that the drum cam 31 can include a single track 36 or multiple tracks 36 for added structure and stability.

Figure 4:
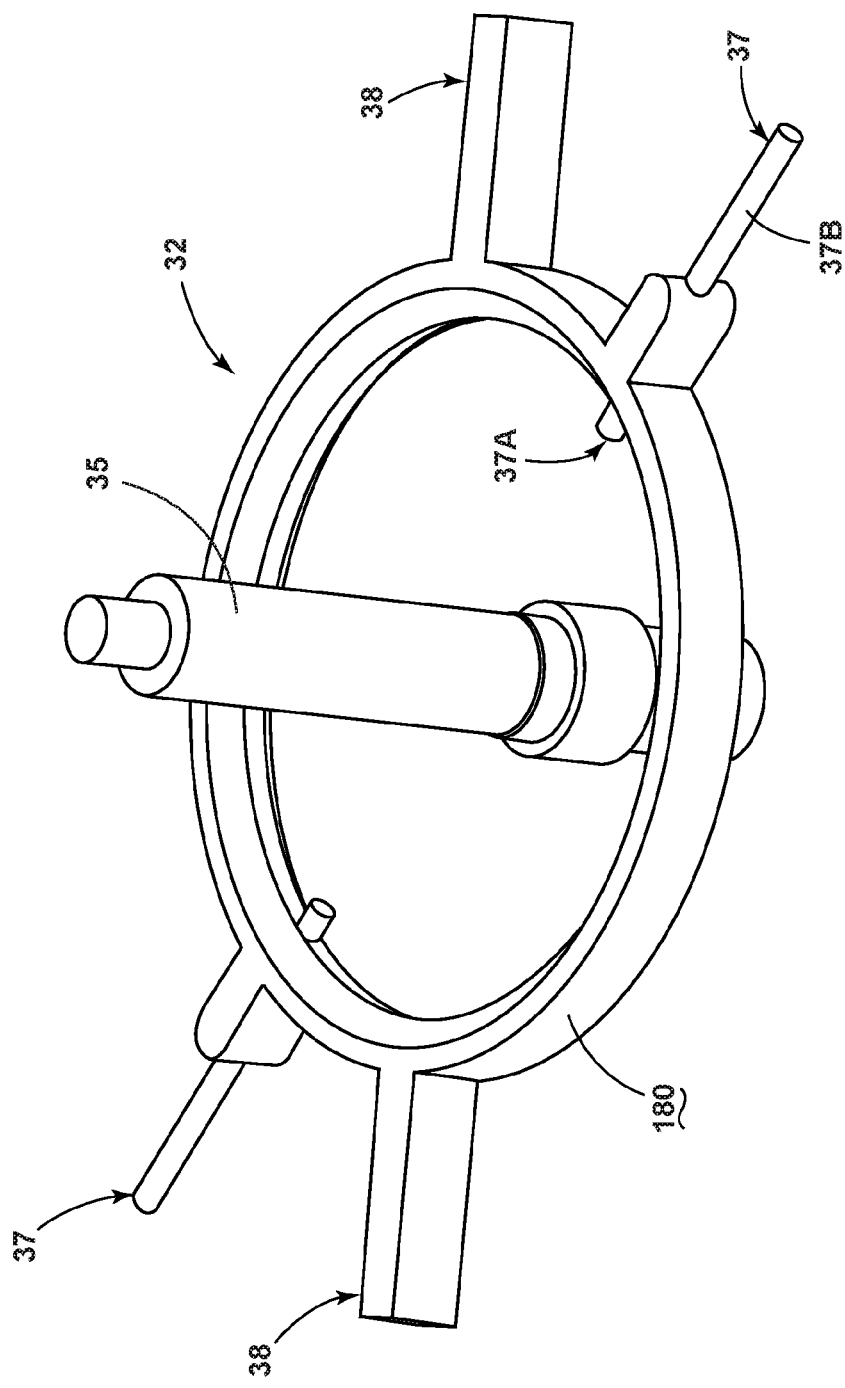
FIG. 4 is a perspective view of a lock ring with a cam follower pin and of the central axle that extends from the base through the drum cam, lock ring and rotor.

FIG. 4 is a perspective view of the lock ring 32. The bias pin 37 includes inner leg 37A that engages and follows the track 36. This engagement with the track 36 (see FIGS. 7-19) causes the lock ring 32 to move axially up and down relative to the drum cam 31 and the rotor 33 to selectively engage and disengage the lock pin 38 relative to the lock notches 40 and 41 in the rotor 33. The selective up and down movement of the lock ring 32 also causes the outer leg 37B of the bias pin 37 to engage and disengage the spring loop 43 of the bias spring 44 for controlling operation of the feel positioner 120 of the shifter apparatus 30. The bias spring 44 can take the form of the AF spring 94.

The central shaft 35 or axle extends upwardly from the base 34 and through the drum cam 31, lock ring 32, and rotor 33 to rotatably support these assembled components. This engagement allows the drum cam 31 and the rotor 33 to operate rotationally and the lock ring 32 to operate axially with respect to one another. Rotation of the drum cam 31 causes the lock ring 32 to translate axially between the rotor 33 and the drum cam 31.

Figure 5:
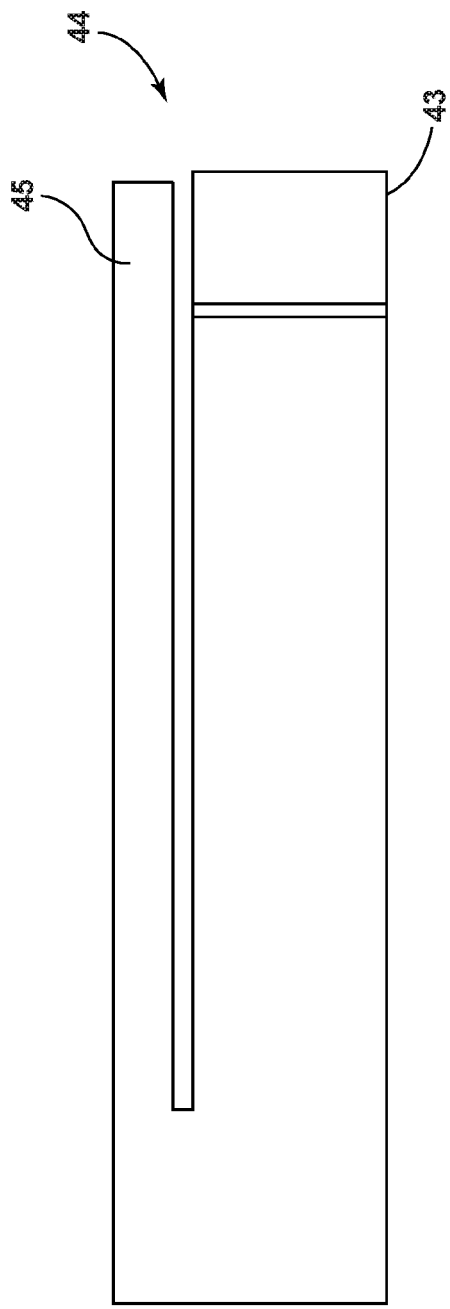
FIG. 5 is a plan view of a feel positioner spring with a lock-ring biasing leg.
Figure 6:
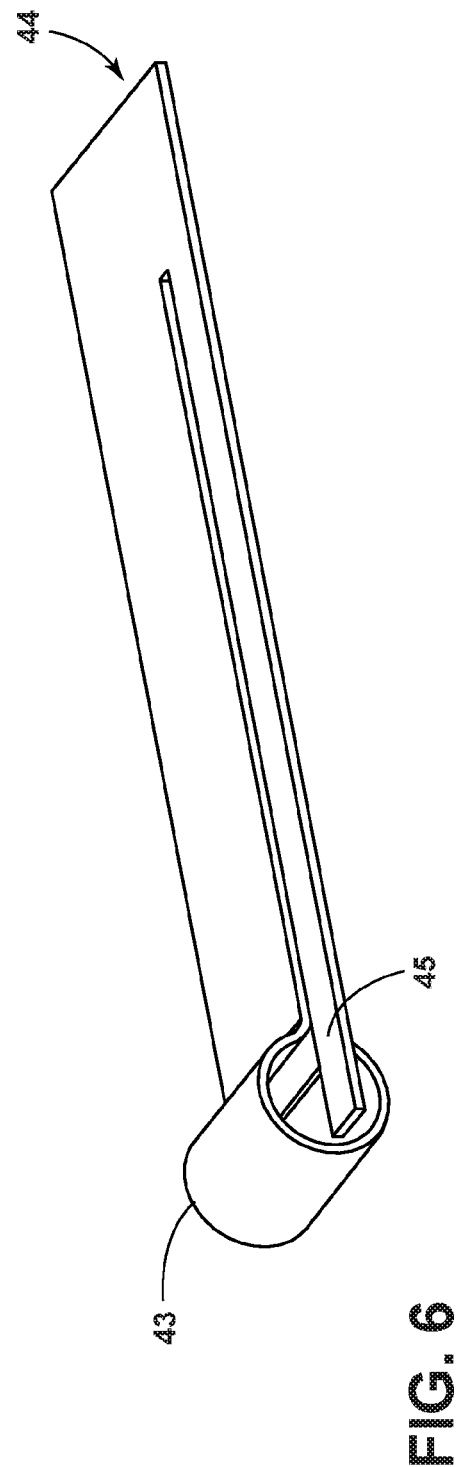
FIG. 6 is a perspective view of the feel positioner spring of FIG. 5.

FIGS. 5-6 are plan and perspective views of the bias spring 44 or AF spring 94 of the feel positioner 120 with spring loop 43, which can take the form of a leaf spring. The bias spring 44 also has a second leaf-spring-like leg spring 45 that engages the outer leg 37B of the bias pin 37. The leg spring 45 serves to selectively bias the inner leg 37A to move toward the lower track section 36B, as described below. Also, the outer leg 37B extends through, and is maintained within, the spring loop 43. In this manner, during the RTP function, the spring loop 43 may bias the inner leg 37A toward the upper track section 37A, as also described below.

Figure 7:
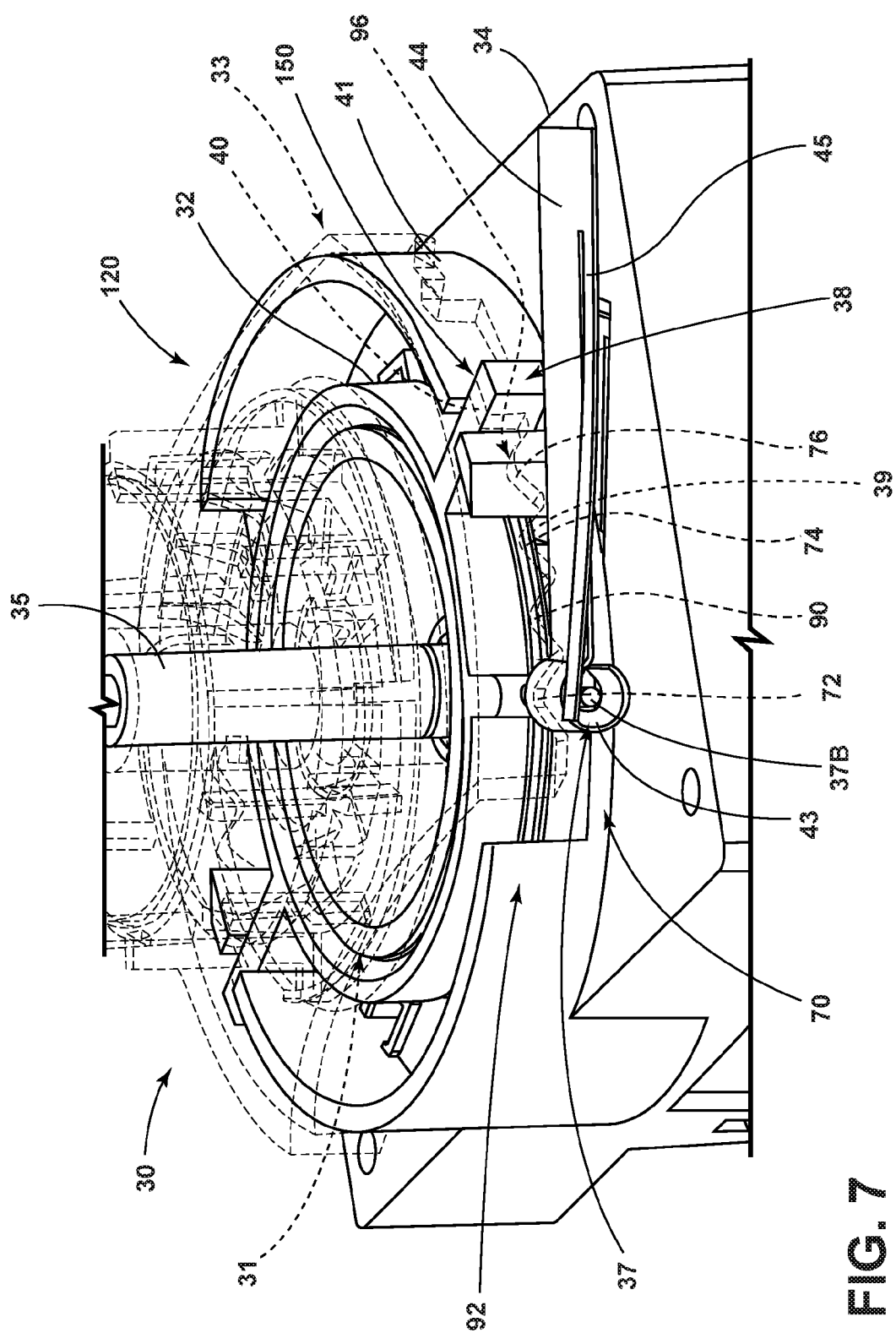
FIG. 7 is a perspective view showing a rotary shifter incorporating the spring of FIG. 5.

FIG. 7 is a perspective view showing one of the pair of bias springs 44 from FIG. 5, the illustrated spring loop 43 operably engaging with the AF detents 96 of the undulating surface 39 of the rotor 33. Two of the bias springs 44 can be used on opposite sides to assist in balancing forces exerted on the rotor 33 and the lock ring 32. (See FIGS. 4 and 23.) The detent or bias spring 44 includes spring loop 43 and spring leg 45 specifically optimized and tuned to the operation of the drum cam 31. Too much pressure by the bias spring 44 may bind the assembly, while too little pressure from the bias spring 44 may render the assembly ineffective as the inner leg 37A of the lock ring 37 may not move up to its return track 36.

The leg spring 45 of the bias spring 44 generally biases the outer leg 37B in a downward direction. This downward biasing force exerted by the leg spring 45 typically occurs when the outer leg 37B is translated upward and the lock pin 38 is moved into one of the lock notch 40 and the gate lock notch 41. The gate lock notch 41 having the partially-locked position 170 corresponds to the drive 76 and the fully-locked position 150 corresponds to neutral 74. The downward biasing force of the leg spring 45 assists in removing the lock pin 38 from the lock notch 40 and gate lock notch 41. In various aspects of the device, the biasing force exerted by the spring loop 43 can be greater than the biasing force exerted by the leg spring 45. Typically, the spring loop 43 and the spring leg 45 are made from a single sheet of metal to define the bias spring 44.

Figure 8:
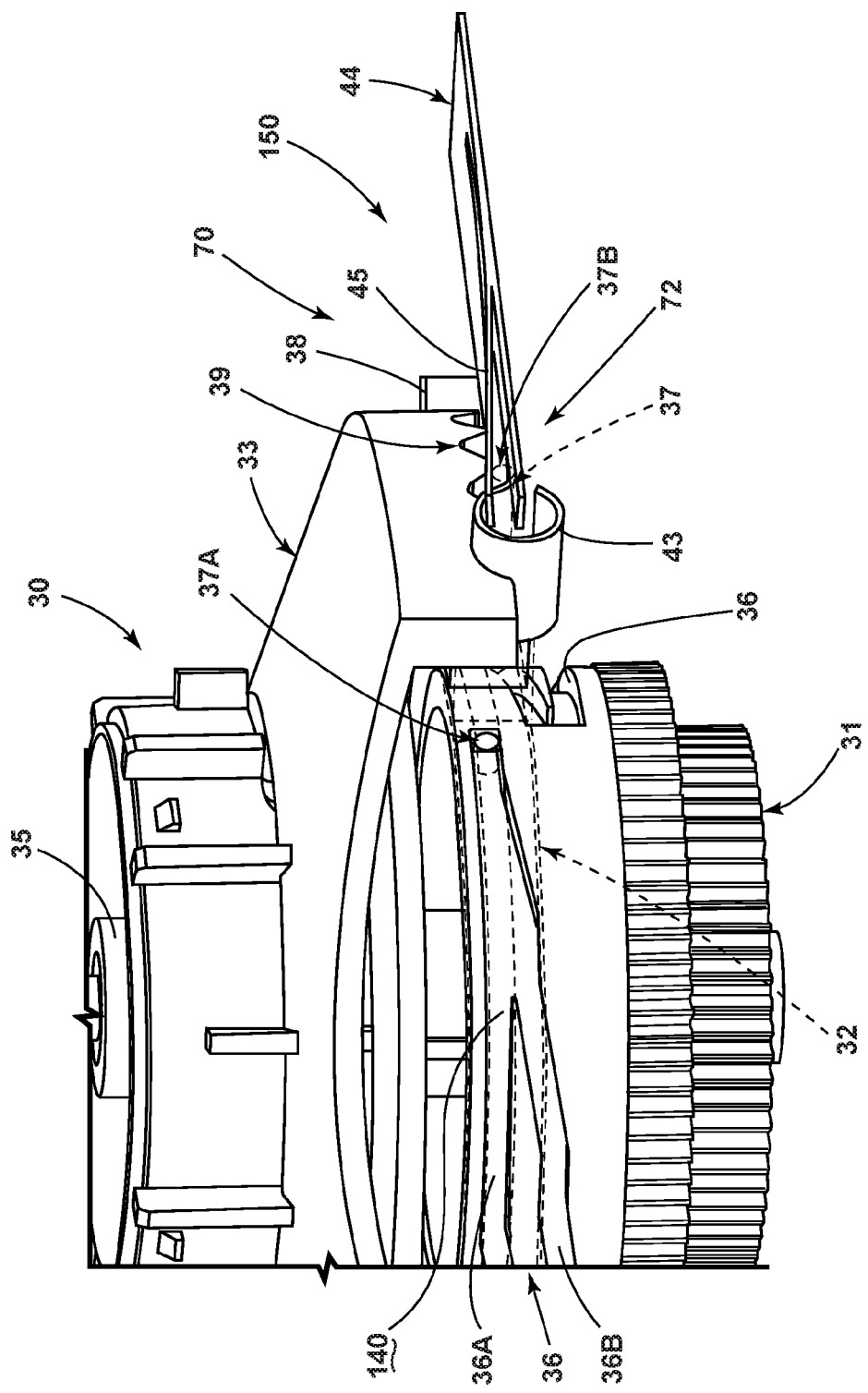
FIG. 8 is a cutaway perspective view of the drum cam having the upper and lower tracks, the cam follower, the knob body in the form of a rotor and one of the feel positioner springs.

FIG. 8 is a broken-away view of the drum cam 31 with track 36, the lock ring 32 that acts as a cam follower, the rotor 33 and a bias spring 44 of the feel positioner 120. As illustrated in FIG. 8, the rotor 33 is fully locked in park 72 by the lock pin 38 of the lock ring 32 engaged in a lock notch 40 of the rotor 33. The bias spring 44 of the feel positioner 120 includes the spring loop 43 that is fully engaged with the AF detent 96 corresponding to park 72 in the undulating surface 39 on the rotor 33. The outer leg 37B of the bias pin 72 on the lock ring 32 is positioned to hold the spring loop 43 of the bias spring 44 in a fully-locked position 150 against the undulating surface 39. In this manner, axial movement of the lock ring 32 results in engagement and retraction-type movement of the outer leg 37B with respect to the spring loop 43 of the AF spring 94.

Figure 9:
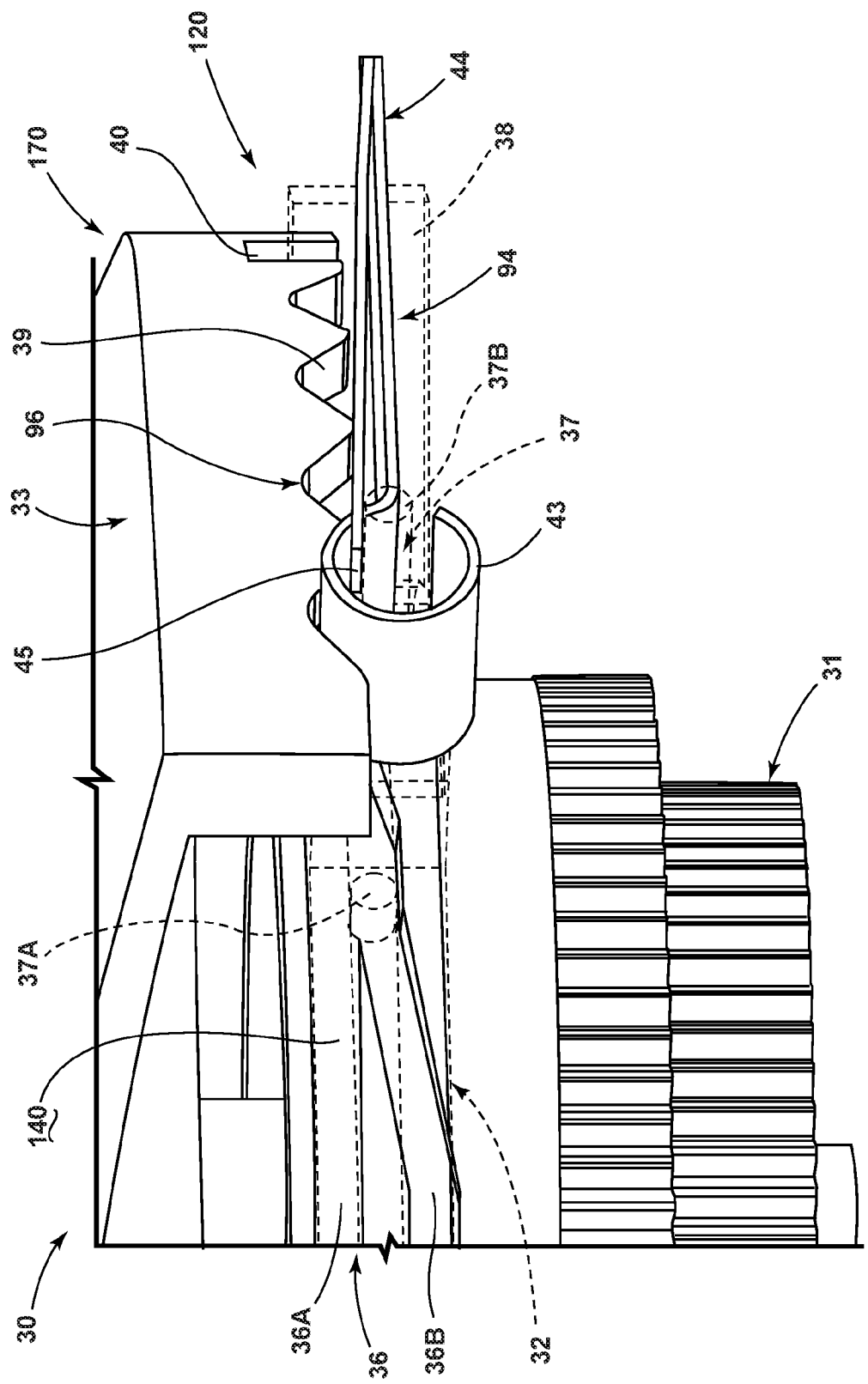
FIG. 9 is a cutaway perspective view of the drum cam of FIG. 8 showing partial movement of the spring out of a gear position.

FIG. 9 is similar to FIG. 8, with the lock ring 32 (cam follower) moved along the cam track 36 to a transition zone 152 that is traversed by the inner leg 37A of the lock ring 32 during the unlock process. In this position, the spring loop 43 (i.e. the "feel-positioner-engaging portion") of the bias spring 44 is engaged with the AF detents 96 of the undulating surface 39. Also, the direction/retraction bias pin 37 on the lock ring 32 (follower) is moved into a center or middle position 162 of the spring loop 43 to thus allow the spring loop 43 to "float," with the lock pin 38 partially out of the lock notch 40 associated with park 72. The "float" of the spring loop 43 corresponds to the selective operation of the AF detents 96 of the rotor 33 across the spring loop 43 to define the various gear positions 70.

Figure 10:
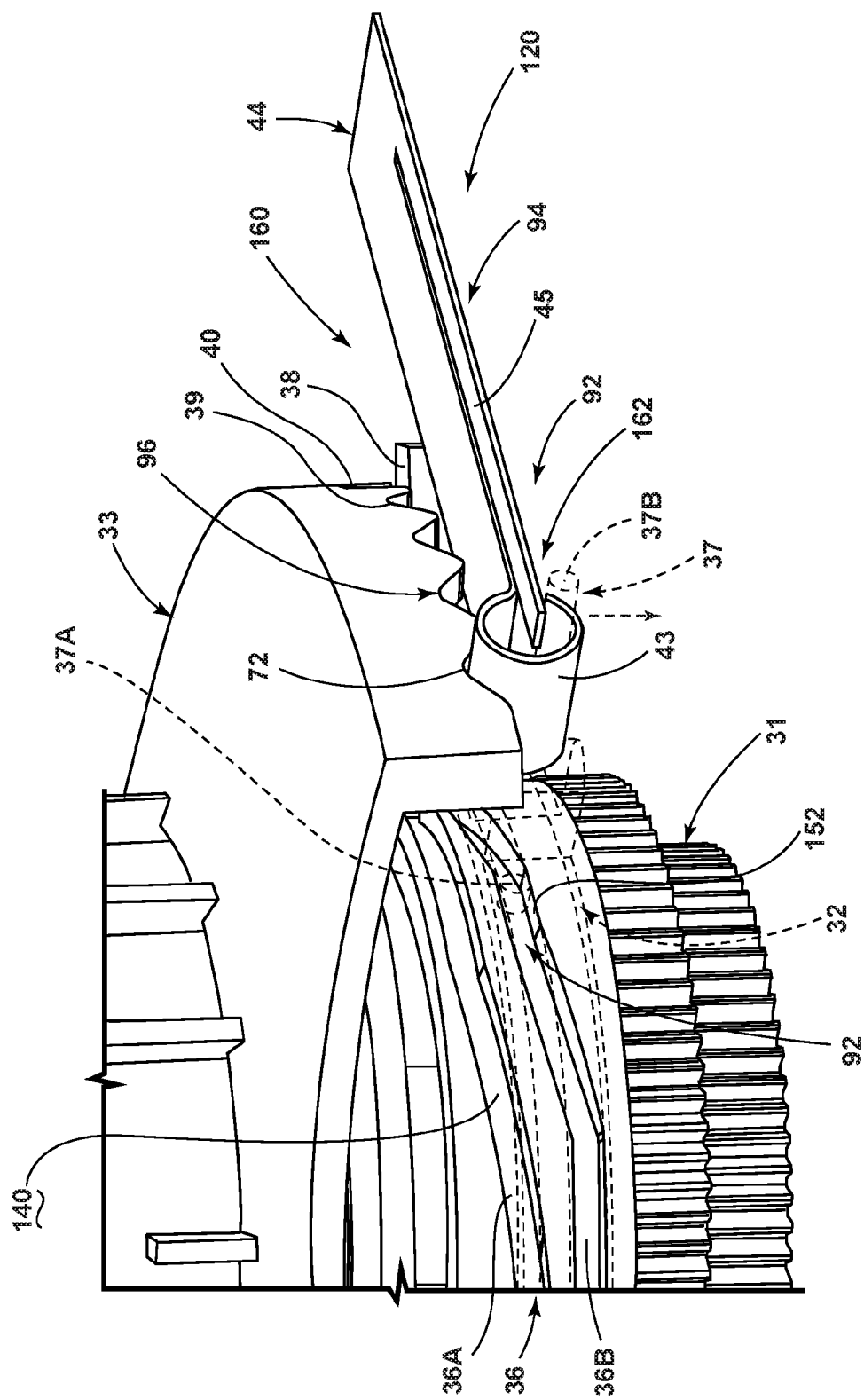
FIG. 10 is a cutaway perspective view of the drum cam of FIG. 9 showing the biasing pin moving the loop spring downward.

FIG. 10 is similar to FIG. 9, with the rotor 33 of the shifter apparatus 30 in the unlocked position 160 with the follower pin 37 being in a middle position 162 in the spring loop 43 indicative of the AF position 92. In the AF position 92, the lock pin 38 is fully out of the lock notch 40 with the spring loop 43 being free to move up or down through the AF detents 96 for artificial feel during rotation of the rotor 33. When moving the rotor 33, the AF position 92 is provided by sliding engagement of the spring loop 43 along undulations 39. Accordingly, the AF position 92 allows for movement of the rotor 33 through the undulations 39 for selecting the various gear positions 70.

Figure 11:
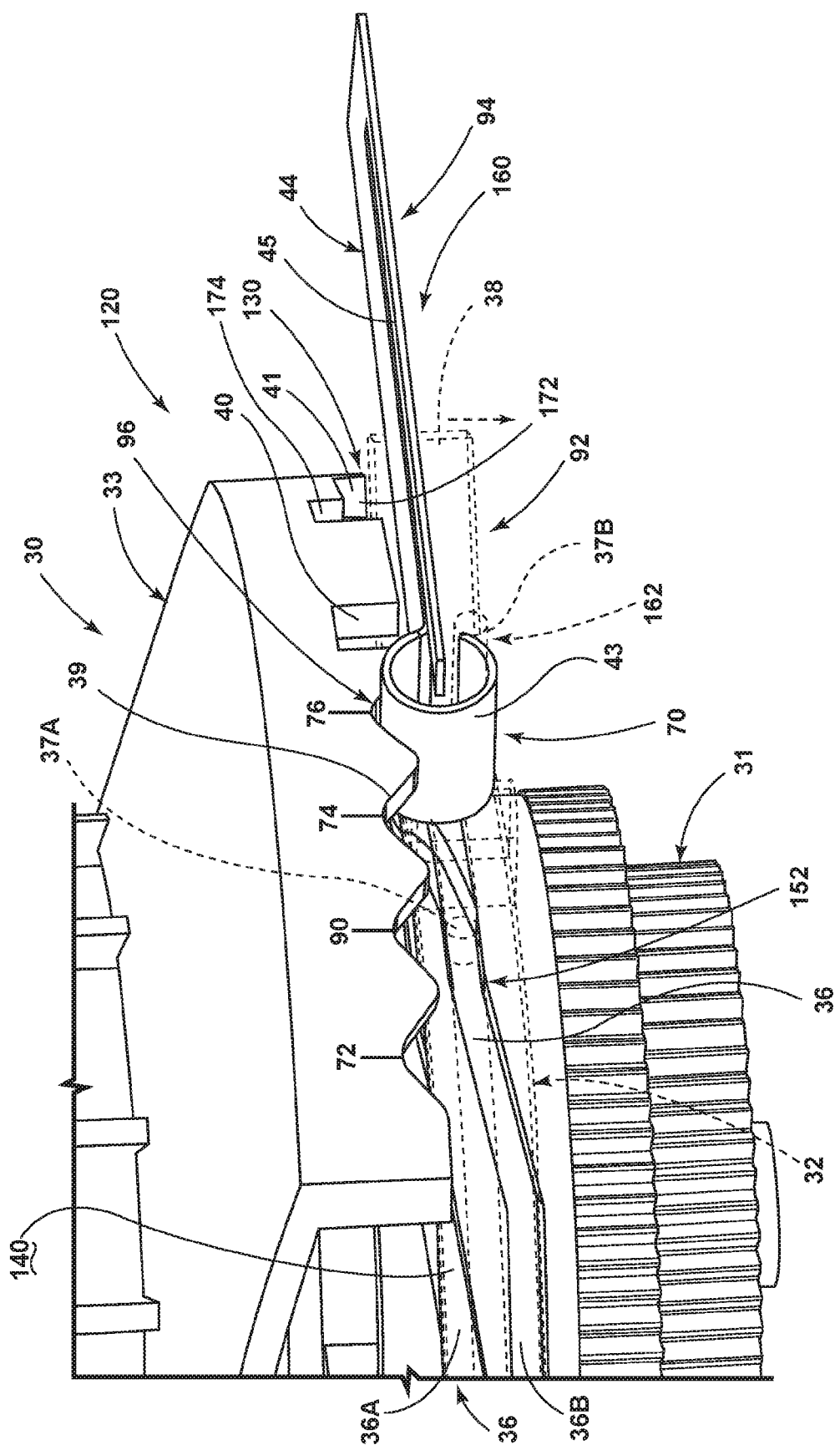
FIG. 11 is a cutaway perspective view of the drum cam of FIG. 10 showing the rotor shifter knob rotated to the drive position.

FIG. 11 is similar to FIG. 10, but with the rotor 33 moved to the gear position 70 corresponding to drive 76. In this position, the outer leg 37B of the follower/bias pin 37 of the lock ring 32 (follower) is in a lowered, unlocked position 160 holding the spring loop 43 under and away from the surface undulation 39 associated with drive 76 and so that the lock pin 38 of the lock ring 32 is under and outside of the lock gate notch 41 associated with neutral 74 and drive 76.

Figure 12:
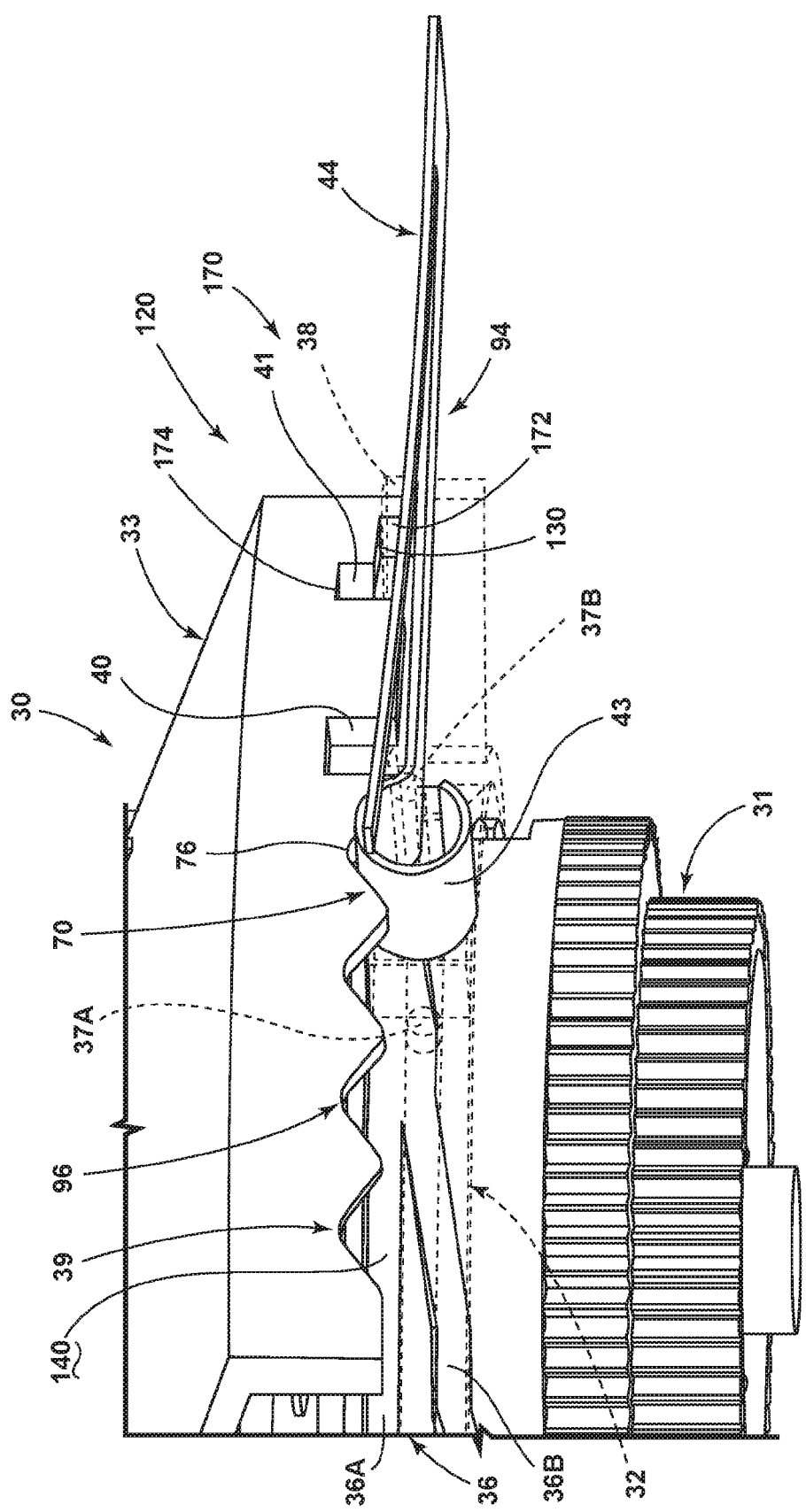
FIG. 12 is a cutaway perspective view of the drum cam of FIG. 11 showing the bias pin in a middle of the loop spring and showing a half-locked position.

FIG. 12 is similar to FIG. 11, but with the follower/bias pin 37 in the middle position 162 of the spring loop 43 to allow the spring loop 43 to float and slidably operate through at least a portion of the AF detents 96 of the undulating surface 39. In this position, the lock pin 38 on the lock ring 32 is now in the partially-locked position 170 (i.e., half way into the gate lock notch 41, called "half-locked"). The partially-locked position 170 allows the rotor 33 of the shifter apparatus 30 to be moved from drive 76 to neutral 74 on the undulating surface 39 due to a combined interconnected shape of the (shallow) drive notch 172 and (deeper) neutral notch 174 (see FIG. 11) of the gate lock notch 41. From this position, the rotor 33 can only be moved from drive 76, where the lock pin 38 is in the partially-locked position 170, to neutral 74, where the lock pin 38 is in the fully-locked position 150.

FIG. 13 is similar to FIG. 12, but with the lock pin 38 of the lock ring 32 now in the fully-locked position 150 in the gate lock notch 41 and the rotor 33 in the gear position 70 corresponding to neutral 74, and with the follower/bias pin 37 holding the spring loop 43 in the AF detent 96 undulating surface 39 associated with neutral 74. FIG. 14 is an enlarged view of a central area in FIG. 13. From this fully-locked position 150 corresponding to neutral 74, the outer leg 37B must be lowered by rotation of the drum cam 31, such as through the RTP function 78 or other shifting operation.

Figure 15:
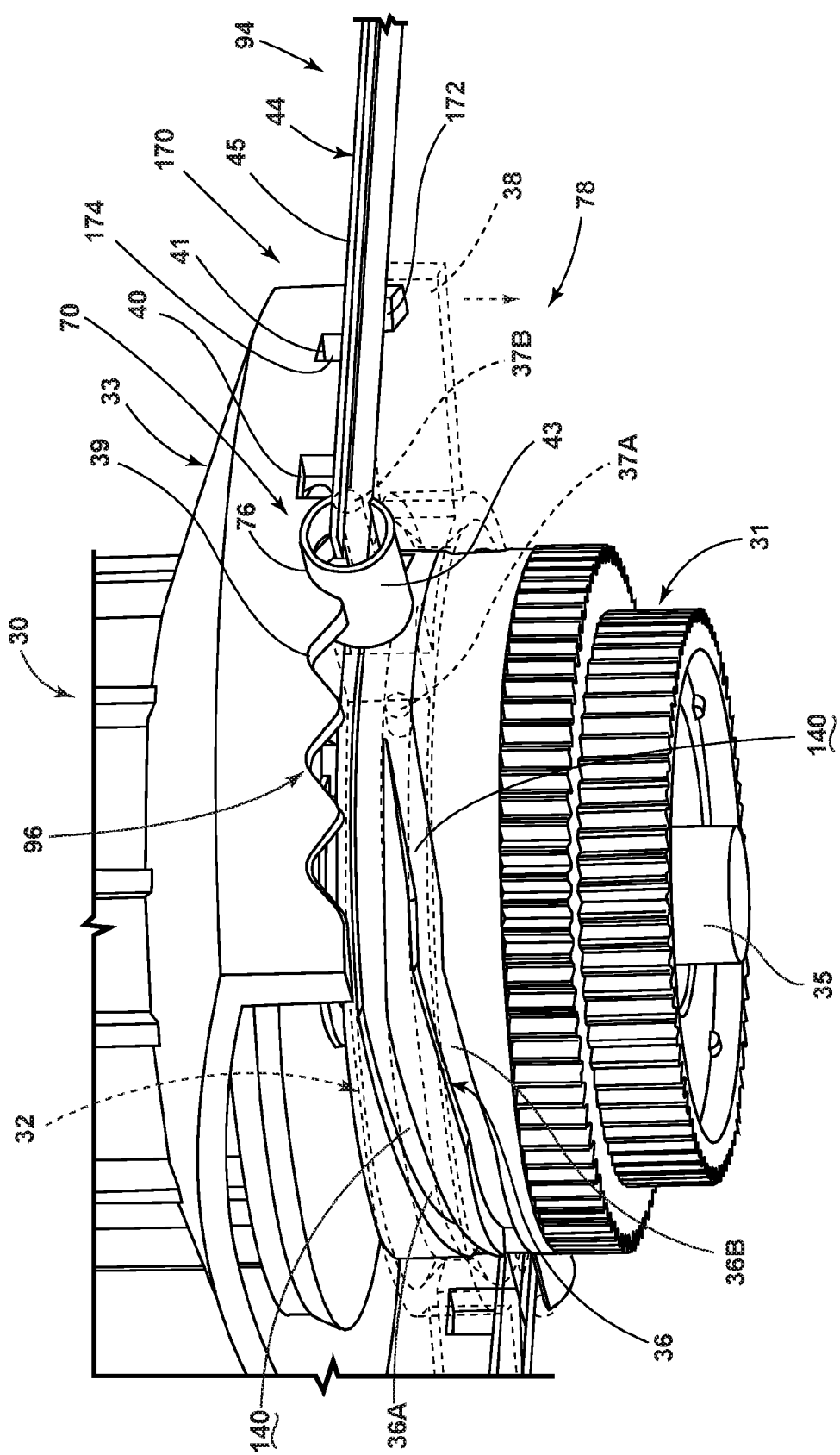
FIG. 15 is a cutaway perspective view of the drum cam of FIG. 13 showing the shifter beginning the process of returning the park position.

FIG. 15 is similar to FIG. 14, but drum cam 31 is rotated and the shifter apparatus 30 is beginning the process of returning to the park position 72 (the RTP function 78). The leg spring 45 of the bias spring 44 pushes the outer leg 37B of the cam follower bias pin 37 (and lock ring 32/follower) to a lower track portion 36B of the track 36. Through this biasing movement generated by leg spring 45, the lock pin 38 is moved out of the gate lock notch 41 associated with drive 76 for beginning the RTP function 78.

Figure 16:
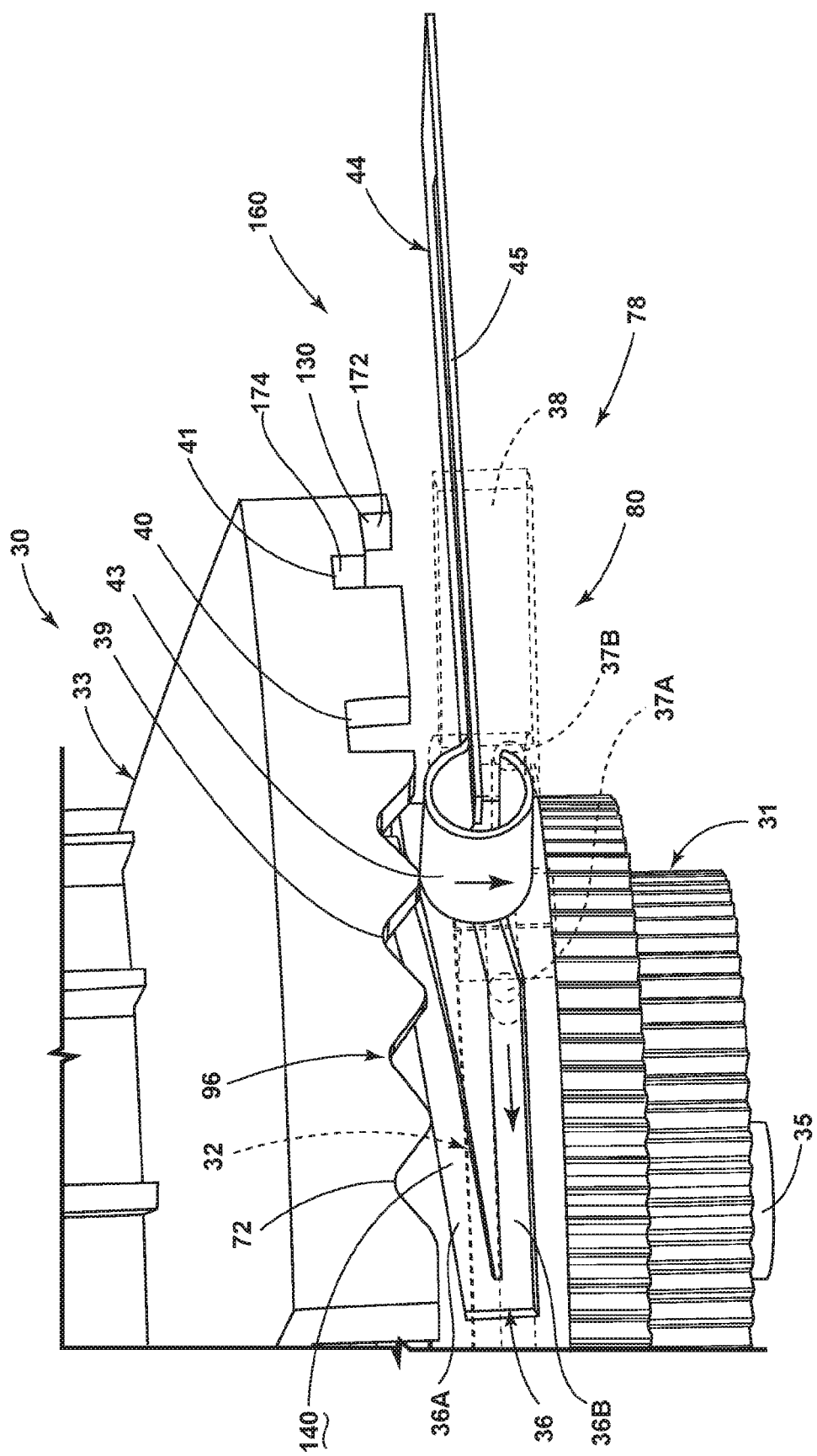
FIG. 16 is a cutaway perspective view of the drum cam of FIG. 15 showing further progression of the shifter returning to the park position.

FIG. 16 is similar to FIG. 15, with the drum cam 31 further rotated and the shifter apparatus 30 being further in the process of the RTP function 78. The lock pin 38 is disengaged from the gate lock notch 41 on the rotor 33, and the inner leg 37A of the lock ring 32/follower in the lower track 36B has pulled the spring loop 43 fully away from the AF detents of the undulating surface 39 to eliminate any start-stop friction on the rotor 33 during rotation. Thus, the rotor 33 is shown in drive 76, but ready to return to the gear position 70 corresponding to park 72 without "start-stop" resistance from the AF detents 96 since the spring 44 and lock pin 38 are retracted away from the undulating surface 39.

Figure 17:
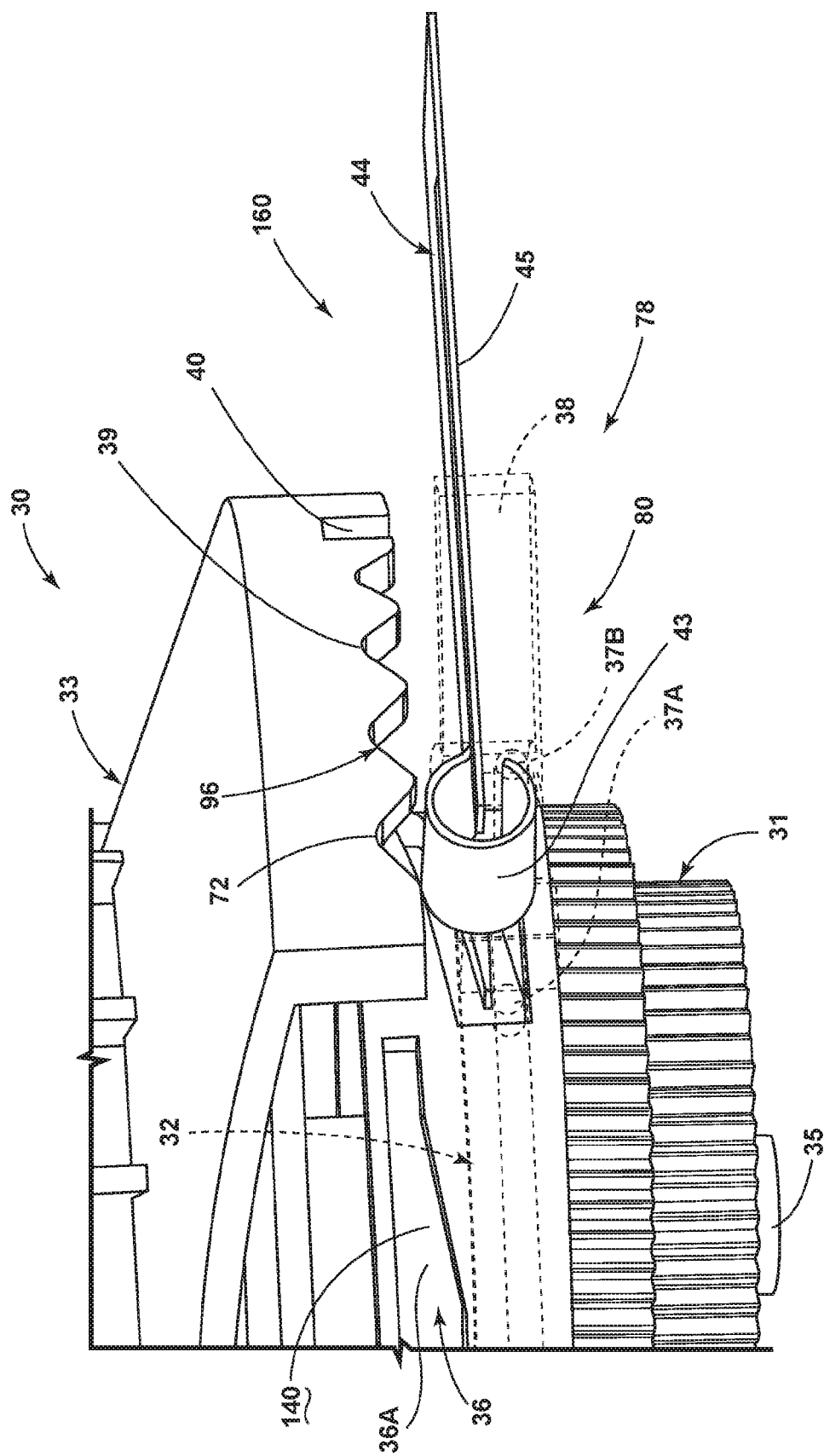
FIG. 17 is a cutaway perspective view of the drum cam of FIG. 16 showing further progression of the shifter returning to the parked position.

FIG. 17 is similar to FIG. 16, with the shifter apparatus 30 still further in the process of the RTP function 78. The inner leg 37A on the lock ring 32 (follower), still within the lower track 36B, causes the outer leg 37B to bias the spring loop 43 away from the undulating surface 39 of the feel positioner 120. The lock ring 32 and hence the bias pin 37 are now biased to move upward with biasing force from the deflected spring loop 43.

Figure 18:
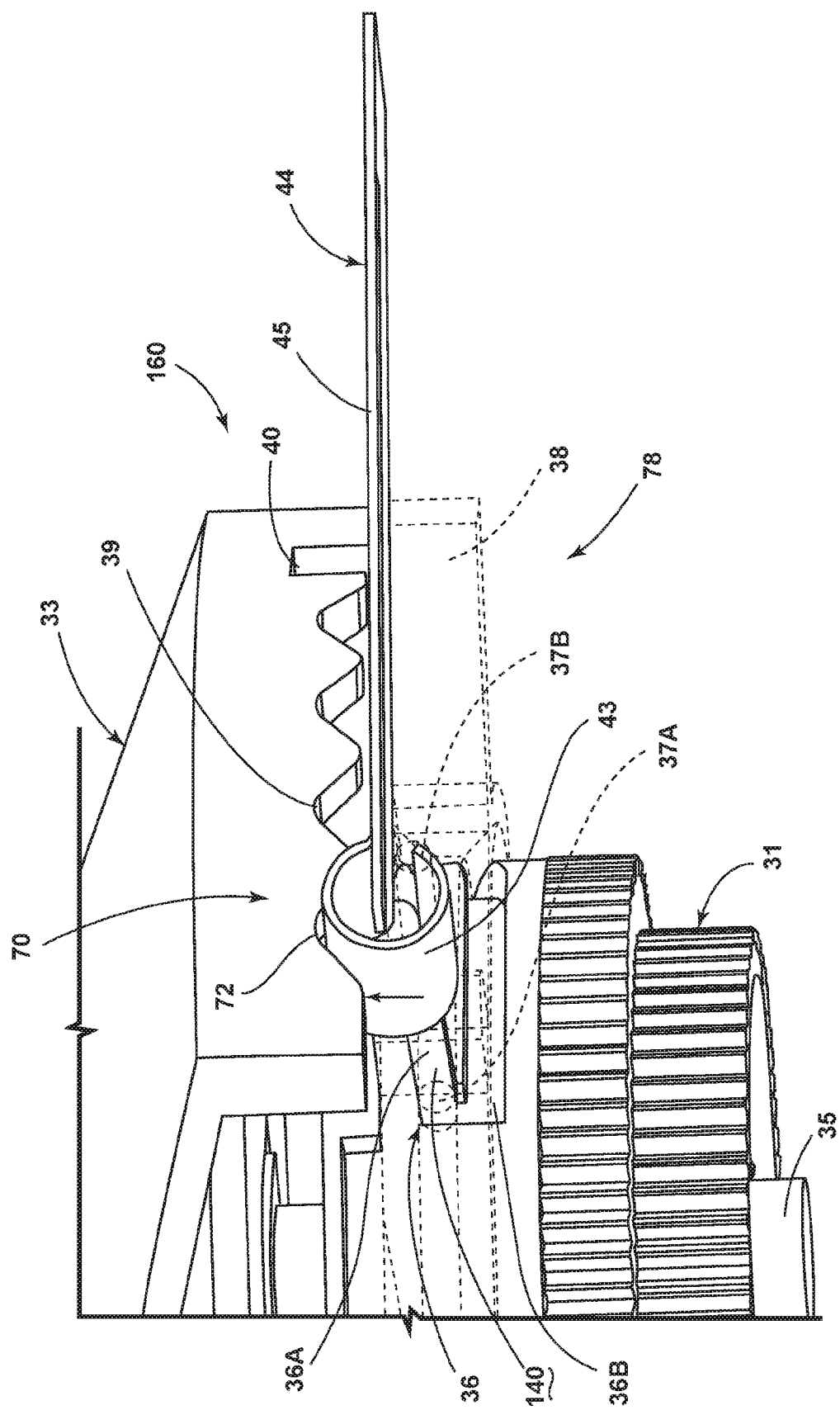
FIG. 18 is a cutaway perspective view of the drum cam of FIG. 17 showing the shifter further in the process of returning to the parked position.

FIG. 18 is similar to FIG. 17 with the shifter apparatus 30 being further in the RTP function 78. The rotor 33 is shown in park 72, and the spring loop 43 of the AF spring 94 is engaged with the AF detents 96 of the surface undulation 39 associated with park 72 (RTP position 80). The lock pin 38 is not yet fully engaged with the gate lock notch 40 associated with park 72. In this position, the inner leg 37A is returned to the upper track 36A by the upward biasing force of the spring loop 43. In this position, the outer leg 37B is in the middle position 162 within the spring loop 43 and the bias spring 44 is in a rest state.

Figure 19:
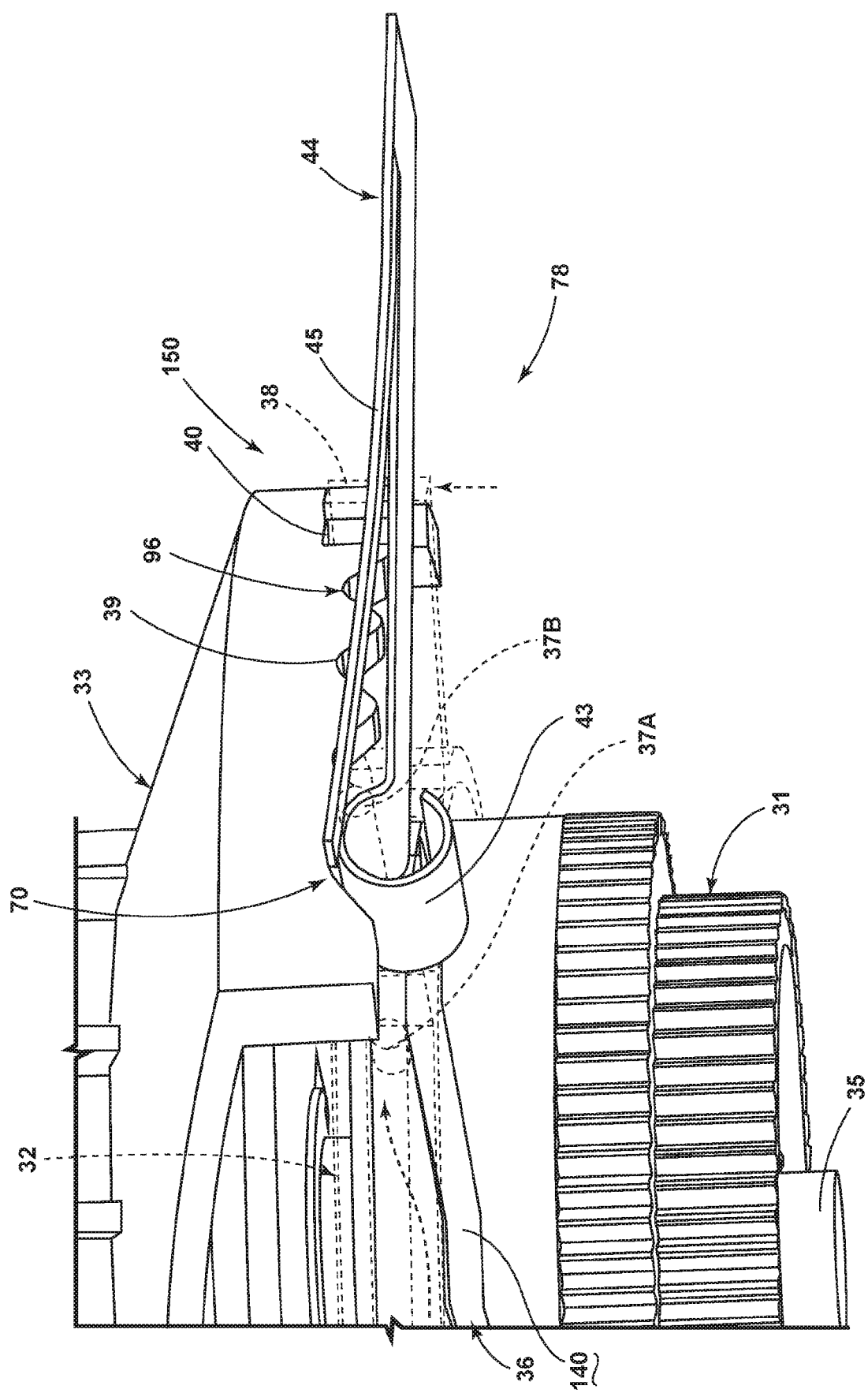
FIG. 19 is a cutaway perspective view of the drum cam of FIG. 18 showing the shifter fully locked in the park position.

FIG. 19 is similar to FIG. 18, with the shifter apparatus 30 in the fully-locked position 150 corresponding to park 72, and with the drum cam 31 rotated to cause the lock ring 32 (cam follower) to move the outer leg 37B upward against the spring loop 43 so that the feel positioner 120 is fully engaged and locked in park 72. Also, the lock pin 38 is fully engaged in the lock notch 40 associated with park 72.

Figure 20:
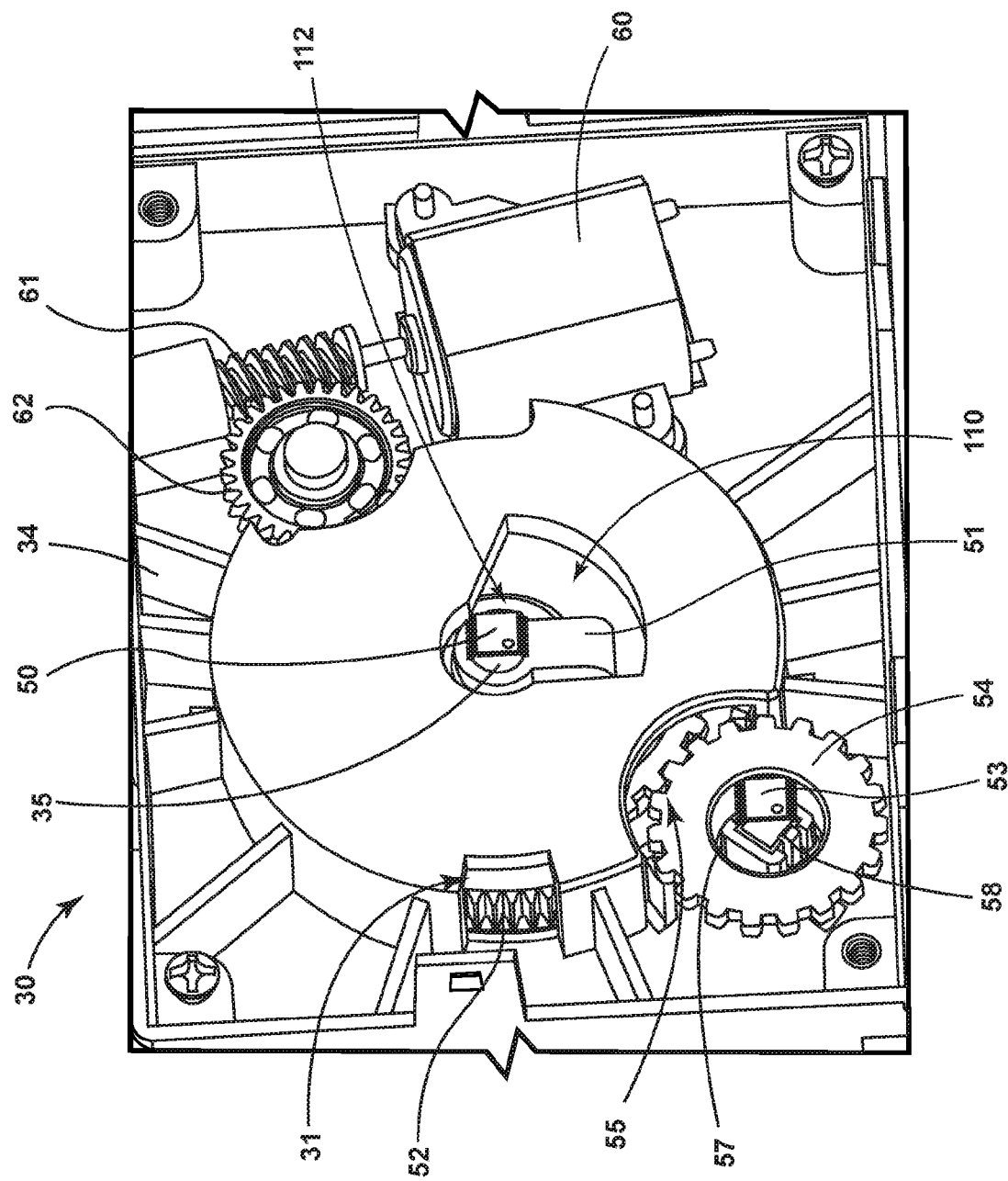
FIG. 20 is a bottom perspective view of a bottom surface of the housing showing position sensors and motors for driving operation of the drum cam.

FIG. 20 is a bottom view looking upward under the shifter apparatus 30 at the base 34 (and cover/housing 42) (see FIG.

Figure 21:
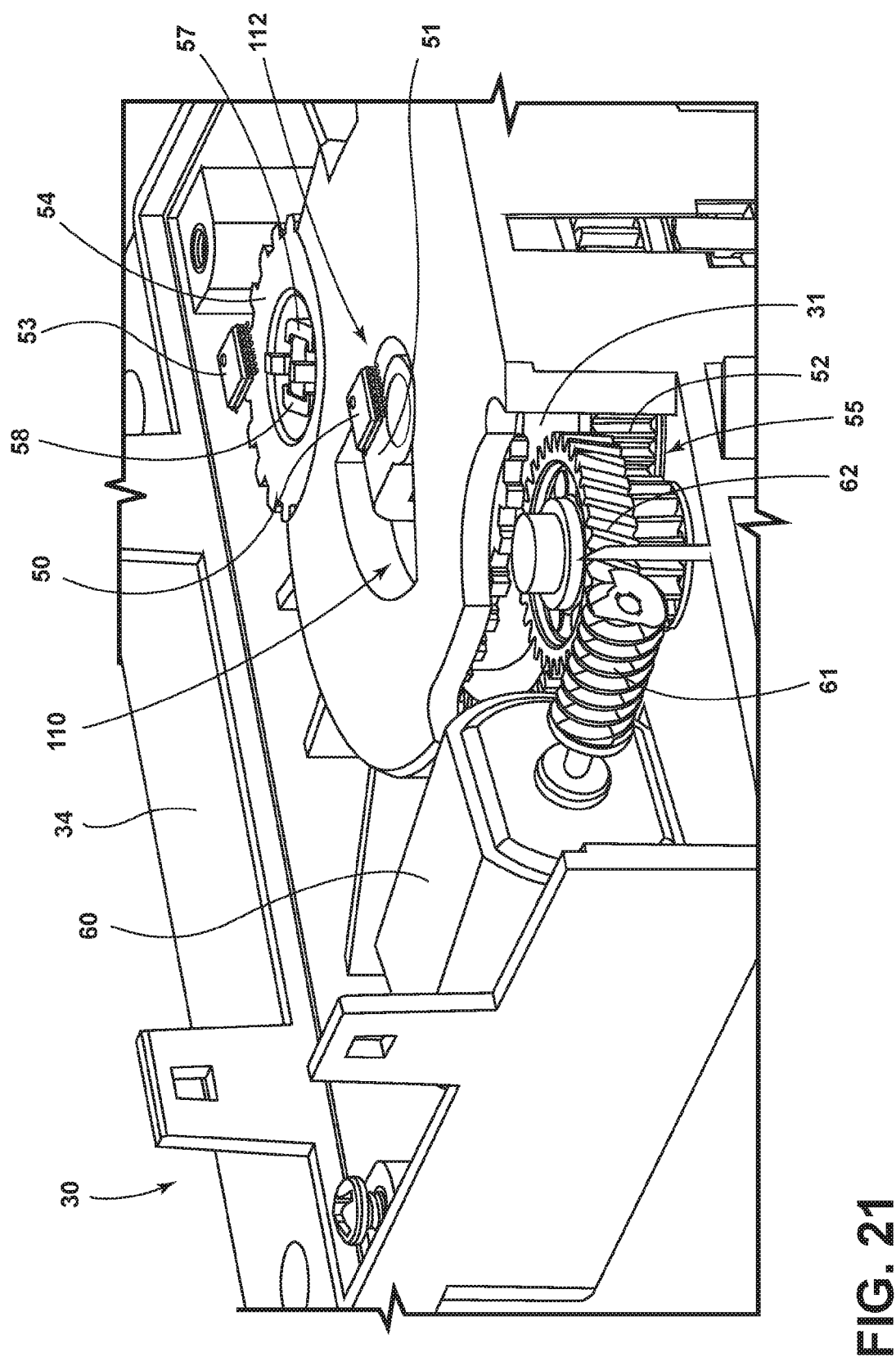
FIG. 21 is a side perspective view of the housing of FIG. 20.

7). FIG. 20 shows several components of the shifter apparatus 30, including a rotor position sensor 50, an associated rotor magnet holder 51 on the central shaft 35 of the shifter apparatus 30 for generating signals in the rotor position sensor 50, a cam cylinder gear 52, a cam position sensor 53 on a wheel 54 that engages mating teeth 55 associated with or fixed to the cam cylinder gear 52, a cam magnet holder 57 on a fixed axle 58 for generating signals in the cam position sensor 53, and an actuator (motor 60, motor-axle-mounted worm gear 61 and driven/drive gear engaging cam gear 62). Cam gear 62 can include a reduction gear for mechanical advantage. FIG. 21 is a perspective view similar to FIG. 20 but at a different angle and with components partially broken away to better show underlying components.

Figure 22:
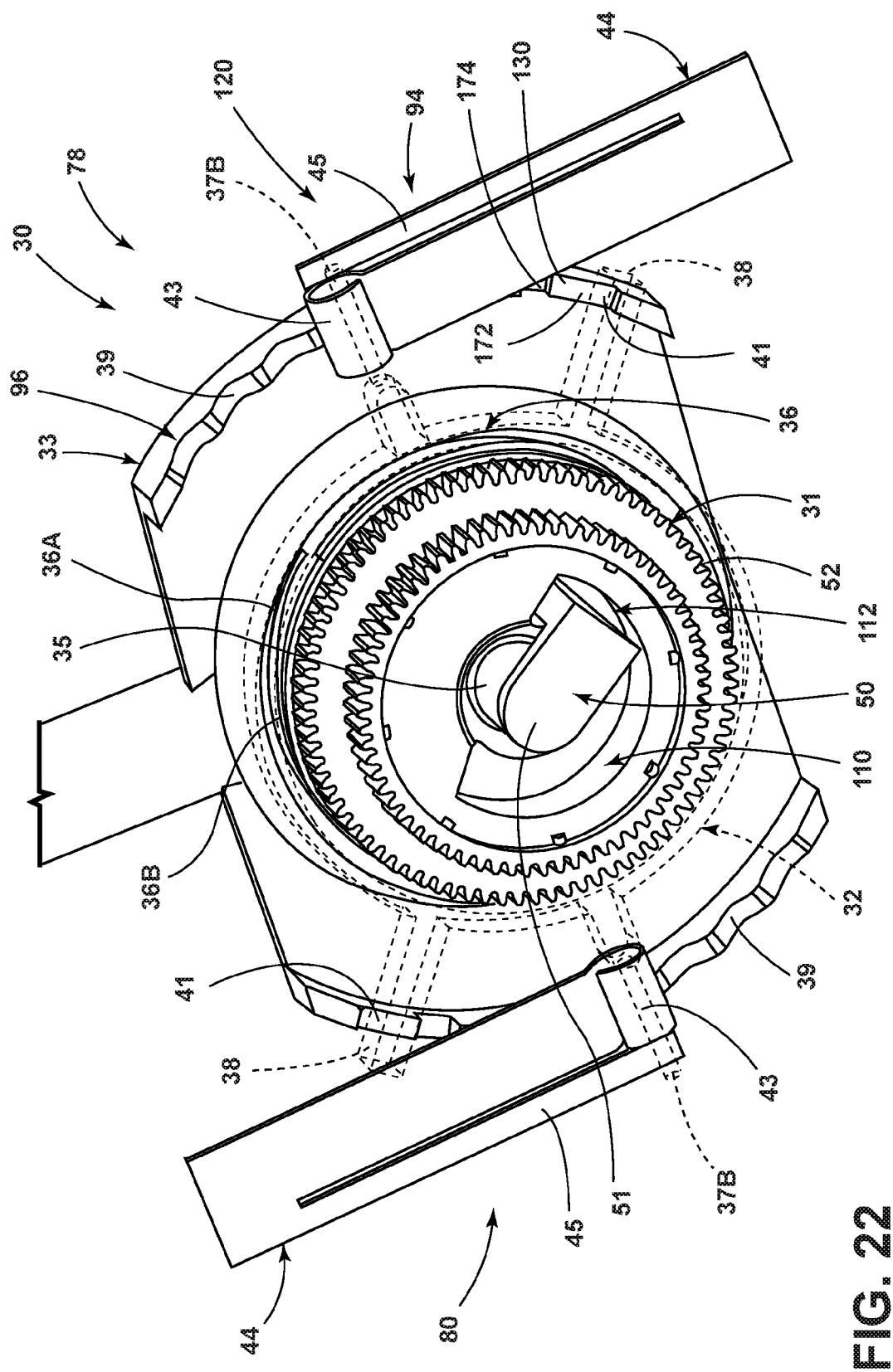
FIG. 22 is a bottom perspective view of the drum cam of FIG. 8 showing the rotor knob in the drive position, and initiating the process of returning to park.
Figure 23:
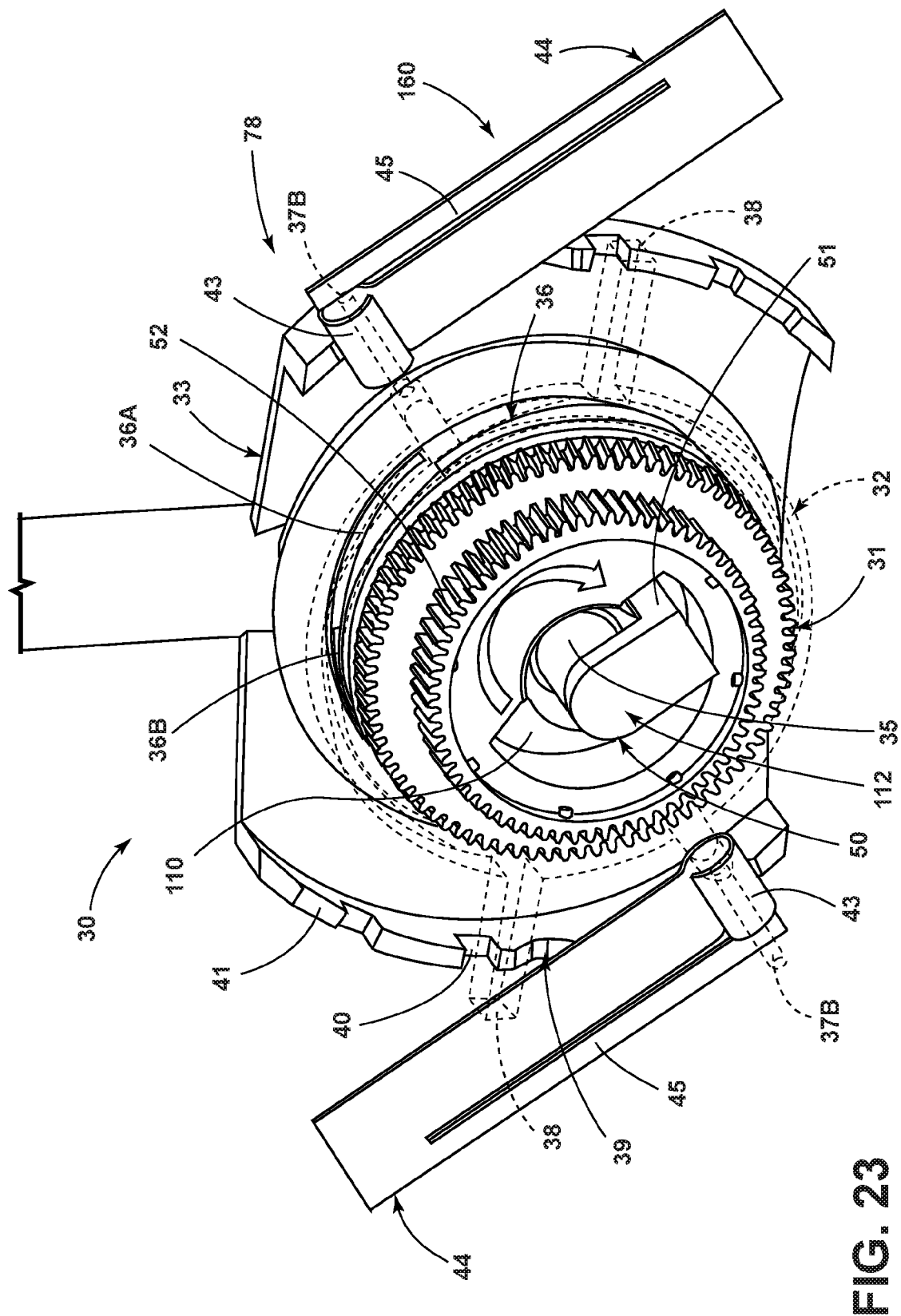
FIG. 23 is a bottom perspective view of the drum cam of FIG. 22 showing the biasing pin returned to park.

FIGS. 22-23 are fragmentary perspective views taken in a direction similar to FIGS. 20 and 21, FIG. 22 showing the rotor 33 in drive 76 after unlock and beginning the RTP function 78, and FIG. 23 showing the rotor 33 in the RTP position 80, with components removed to better show underlying components and their relationship, and also showing an opposing "balanced" position of the two bias springs 44 and two lock pins 38, two tracks 36 and related undulating surfaces 39 and lock notches 40, 41 engaged by the bias springs 44 and lock pins 38.

The present arrangement includes a rotating barrel drum cam 31; a cam follower, also called lock ring 32, which moves in an axial direction; and a rotor 33 (also called a dial-type shifter or knob herein) with track features 36 for the inner leg 37A of the cam follower 37 to engage and to lock and unlock the rotation of the rotor 33. A continuous track 36 on the drum cam 31 allows the follower 32 to switch between two paths and consequently cause two different functions (i.e. locking and unlocking of the rotor 33) based on the follower position versus a cam angle. The geometry of the tracks 36A/36B and a biasing member 44 determine the path taken by the lock ring 32 (follower) depending on the direction of the rotation of the drum cam 31. The combination of these items allow free rotation of the rotor 33, or locking of the rotor 33, and/or controlled movement of the rotor 33 based on positioning of the drum cam 31. A significant benefit of the two distinct upper and lower tracks 36A, 36B is the ability to keep the rotor 33 locked throughout the entire rotation of the drum cam 31 while within the track 36.

The ability to provide an arrangement where a drum cam 31 locks and unlocks the rotor 33 is significant. A feature of this arrangement is its ability to rotate the rotor 33 from one position to another and then keep the rotor 33 in a fully-locked position 150 while the drum cam 31 returns to its original (locking or unlocking) position.

The present arrangement includes an actuation arm in the form of bias pin 37; a spring loop 43 which surrounds a portion of the bias pin 37; and an additional leg spring 45 which applies a small bias to the bias pin 37. The surrounded portion of the bias pin 37 is an appendage of the follower or lock ring 32 described above. A combination of the outer diameter 180 of the actuation arm or bias pin 37 or bias pin, the inner diameter of the spring loop 43, and the cam follower's motion of the cam follower or inner leg 37A along tracks 36A, 36B determine whether the lock ring 32 is in a free state where the rotor 33 can freely rotate or react against the mating surfaces of the drum cam 31. The reaction forces against the drum cam 31 can be used in the mechanism for the bias spring 44 to force the follower or lock ring 32 to a particular position. Alternatively, the drum cam 31 can force the spring loop 43 to a particular position, and potentially can lock the spring loop 43 in that position. The leg spring 45 is used to provide a relatively small force while the spring loop 43/bias pin 37 are in a free state. The purpose of this is two-fold: 1.) to allow the drum cam 31/follower 32 combination described above to work and 2.) to prevent the follower lock rings 32 from rattling within the track 36 of the drum cam 31.

A significant benefit of this bias spring 44/bias pin 37 combination is its ability to allow the drum cam 31 to remove the spring force (by deflecting the bias spring 44) in one position while applying additional force to the bias spring 44 in another. The benefit in the shifter apparatus 30 is removal of the detent action during a RTP function 78 and the ability for the electronic shifter apparatus 30 to force the rotor 33 into an AF position 92 within the AF detents 96. This is a benefit when the AF detents 96 alone do not provide enough force to center itself in a gear position 70.

Thus, it is to be understood that variations and modifications can be made on the aforementioned structure without departing from the concepts of the present invention, and further it is to be understood that such concepts are intended to be covered by the following claims, unless these claims by their language expressly state otherwise.

What is claimed is:

1. A shifter apparatus comprising:
   a base and a shifter rotatingly supported on the base;
   a rotating drum cam with a track;
   a lock ring including a bias pin which moves the lock ring in an axial direction as the bias pin engages and moves along the track;
   the shifter including at least one lock notch for the bias pin to engage with to lock rotation of the shifter;
   a first spring having a spring loop which surrounds the bias pin;
   an additional spring which applies a small bias to the bias pin;
   a combination of the bias pin's outer diameter, the spring loop's inner diameter, and a motion of the bias pin causing the bias pin to move between a free state where the shifter moves without resistance and a force-generating state where the bias pin generates reaction forces against surfaces of the rotating drum cam to affect rotation of the shifter, and where the reaction forces against the lock ring are used to force the lock ring and bias pin to a particular position.

2. The shifter apparatus of claim 1, wherein the first spring provides a greater biasing force than the additional spring on the lock ring.

3. The shifter apparatus of claim 2, wherein the first spring and the additional spring combine to bias the lock ring in a manner causing the bias pin to move between the free state and the force-generating state to thus cause operation of the lock ring while also preventing the bias pin from rattling within the track.

4. The shifter apparatus of claim 3, wherein the first spring includes an ability to allow the rotating drum cam to remove all spring force by deflecting the additional spring in one position, and also includes an ability to apply additional force to the additional spring in another position, thus providing removal of a detent action during a return-to-park cycle, and also providing an ability for the shifter apparatus to force the shifter into a gear position while the return-to-park cycle is completed.

5. A shifting apparatus for a vehicle comprising:
   a base;
   a drum cam rotatably supported on the base and having a track;

a lock ring rotationally supported on the base and axially operable relative to the track of the drum cam; and a rotor rotationally supported on the base, wherein the lock ring extends between the drum cam and the rotor, wherein rotational operation of the track of the drum cam defines a plurality of axial positions of the lock ring, wherein the plurality of axial positions of the lock ring include a locked position, a partially-locked position, an artificial feel position and a return-to-park position.

6. The shifting apparatus of claim 5, wherein the track includes a continuous loop having an upper track and a lower track, wherein the upper track defines the locked position at an upper-most portion of the track, defines the artificial feel position at a medial portion of the upper track, and wherein the partially-locked position is defined within the lower track at the upper-most portion.

7. The shifting apparatus of claim 6, wherein the lower track defines the return-to-park position of the lock ring.

8. The shifting apparatus of claim 7, further comprising a bias spring having a spring loop that at least partially surrounds a portion of the lock ring and a leg spring that biases the lock ring toward the base in the locked position, wherein the spring loop and the leg spring are integrally formed as a single sheet of metal.

9. The shifting apparatus of claim 8, wherein the return-to-park position is defined by the lock ring being engaged with the lower track and the spring loop biasing the lock ring toward the rotor.

10. The shifting apparatus of claim 8, wherein the rotor includes an undulating surface that defines a plurality of gear positions, wherein the rotor also includes a lock notch that corresponds to a parked position of the undulating surface and a gate lock notch that corresponds to drive and neutral positions of the undulating surface.

11. The shifting apparatus of claim 10, wherein the gate lock notch defines the partially-locked position that corresponds to the drive position and a fully-locked position that corresponds to the neutral position.

12. The shifting apparatus of claim 10, wherein the spring loop in the artificial feel position engages the undulating surface of the rotor and the spring loop is biased toward the plurality of gear positions defined within the undulating surface.

13. The shifting apparatus of claim 8, wherein the spring loop biases the lock ring toward the rotor in the return-to-park position and the leg spring biases the lock ring toward the base in the locked and partially-locked positions.

14. The shifting apparatus of claim 8, wherein the spring loop and the leg spring define a rest state when the lock ring is in the artificial feel position.

15. The shifting apparatus of claim 8, wherein the return-to-park position is defined by the spring loop being disengaged from the rotor.

16. The shifting apparatus of claim 5, wherein the locked position is defined by the lock ring being placed in a notch of the rotor, wherein the notch defines at least a gear position of a plurality of gear positions corresponding to park.

17. A shifter apparatus comprising:
a rotating drum cam having a continuous track;
a lock ring including a cam follower that operates in an axial direction; and
a rotor wherein a lock pin of the cam follower operates to lock a rotation position of the rotor, wherein:
the cam follower sequentially engages the continuous track having upper and lower cam paths, wherein the upper and lower cam paths define a plurality of positions of the cam follower based on a relative angle of the rotating drum cam relative to the lock ring; and
a geometry of the continuous track, a rotational direction of the rotating drum cam and a biasing member engaged with the lock ring determine whether the cam follower follows the upper or lower cam path.

18. The shifter apparatus of claim 17, wherein the rotor, the rotating drum cam and the lock ring interact to define at least three operative positions of the rotor including a first free-rotating position defined by a free rotation of the rotor, a second locked position defined by a locked angular position of the rotor, and a third guided position defined by a controlled movement of the rotor based on a relative locked angular position of the rotating drum cam with respect to the rotor.

19. The shifter apparatus of claim 18, wherein the third guided position is further defined by selective movement of the rotor in a first rotational position to a second rotational position, wherein the cam follower locks the rotor in a home position while the rotating drum cam returns to an original home position.

* * * * *